United States Patent [19]
Guido et al.

[11] Patent Number: 5,732,381
[45] Date of Patent: Mar. 24, 1998

[54] METHOD AND SYSTEM FOR GENERATING A FUEL PULSE WAVEFORM

[75] Inventors: Samuel James Guido, Dearborn; Rollie Morris Fisher; John Mark Wilson, both of Trenton, all of Mich.; Micah Charles Knapp, New Haven, Conn.; Gary Lynn Miller; Philip Enrique Madrid, both of Round Rock, Tex.

[73] Assignees: Ford Motor Company, Dearborn, Mich.; Motorola, Inc., Schaumburg, Ill.

[21] Appl. No.: 618,047

[22] Filed: Mar. 25, 1996

[51] Int. Cl.[6] .................................................. F02D 41/34
[52] U.S. Cl. ......................... 701/104; 701/102; 701/103; 701/105; 701/115; 123/416; 123/417; 123/480; 123/486
[58] Field of Search .................... 364/431.052, 431.051, 364/431.053, 431.04, 431.12; 123/486, 480, 417, 416

[56] References Cited

U.S. PATENT DOCUMENTS

| | | | |
|---|---|---|---|
| 3,935,846 | 2/1976 | Zelenka | 123/117 |
| 4,320,732 | 3/1982 | Schnürle et al. | 123/478 |
| 4,512,317 | 4/1985 | Pauwels et al. | 123/478 |
| 5,546,909 | 8/1996 | Messih et al. | 123/492 |

FOREIGN PATENT DOCUMENTS

| | | |
|---|---|---|
| 0671556 | 8/1995 | European Pat. Off. . |
| 2028541 | 5/1980 | United Kingdom . |

*Primary Examiner*—Tan Q. Nguyen
*Attorney, Agent, or Firm*—Peter Abolins; Roger L. May

[57] ABSTRACT

A method and system for generating a fuel pulse output signal to control fuel delivery from a fuel injector to a cylinder of an internal combustion engine. A plurality of holding registers asynchronously receive a plurality of fuel pulse data from a processor. The plurality of holding registers are memory-mapped and store the plurality of fuel pulse data until subsequent fuel pulse data is received from the processor. A plurality of match registers are coupled to the plurality of holding registers for comparing the fuel pulse data with a reference signal and generating a fuel pulse output signal based on the comparison between the fuel pulse data and the reference signal.

20 Claims, 8 Drawing Sheets

Bit Number:

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| Reserved | | FECTB | | | SECTB | | | 12/16U | 12/16L | EAMTB | | | FEMTB | | |
| 0 | 0 | 0 | 0 | 0 | 0 | 0 | 0 | 0 | 0 | 0 | 0 | 0 | 0 | 0 | 0 |

Reset:

Bit Number:

| 16 | 17 | 18 | 19 | 20 | 21 | 22 | 23 | 24 | 25 | 26 | 27 | 28 | 29 | 30 | 31 |
|----|----|----|----|----|----|----|----|----|----|----|----|----|----|----|----|
| DOME | Reserved | | | | | | SCC | CSTU | CSTL | CLKU | | | CLKL | | |
| 0 | 0 | 0 | 0 | 0 | 0 | 0 | 0 | 0 | 0 | 0 | 0 | 0 | 0 | 0 | 0 |

Reset:

*Fig. 8*

Bit Number:

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| CLU | | CLL | | TOM | | | Res | 16/32 | MOTD | PWM | OEDC0 | OEDC1 | Reserved | | |
| 0 | 0 | 0 | 0 | 0 | 0 | 0 | 0 | 0 | 0 | 0 | 0 | 0 | 0 | 0 | 0 |

Reset:

Bit Number:

| 16 | 17 | 18 | 19 | 20 | 21 | 22 | 23 | 24 | 25 | 26 | 27 | 28 | 29 | 30 | 31 |
|----|----|----|----|----|----|----|----|----|----|----|----|----|----|----|----|
| MOE3 | Res | MOE2 | | | MOE1 | | EAMOS | MOE0 | | FME0 | FME1 | FME2 | FME3 | CPIE | Res |
| 0 | 0 | 0 | 0 | 0 | 0 | 0 | 0 | 0 | 0 | 0 | 0 | 0 | 0 | 0 | 0 |

Reset:

*Fig. 9*

Bit Number:

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| Res | | FECF | SECF | MOF0 | MOF1 | MOF2 | MOF3 | IZSU | IZSL | FECS | SECS | MOS0 | MOS1 | MOS2 | MOS3 |
| 0 | 0 | 0 | 0 | 0 | 0 | 0 | 0 | 0 | 0 | 0 | 0 | 0 | 0 | 0 | 0 |

Reset:

| 16 | 17 | 18 | 19 | 20 | 21 | 22 | 23 | 24 | 25 | 26 | 27 | 28 | 29 | 30 | 31 |
|----|----|----|----|----|----|----|----|----|----|----|----|----|----|----|----|
| Reserved | | | | | | | | | | | | | | | |
| 0 | 0 | 0 | 0 | 0 | 0 | 0 | 0 | 0 | 0 | 0 | 0 | 0 | 0 | 0 | 0 |

Reset:

*Fig. 10*

METHOD AND SYSTEM FOR GENERATING A FUEL PULSE WAVEFORM

CROSS-REFERENCE TO RELATED APPLICATION

This application is related to U.S. patent application Ser. No. 08/618,048 entitled "Method and System for Generating Ignition Coil Control Pulses" filed on the same day as the present application and having the same assignee, now U.S. Pat. No. 5,678,798.

1. Technical Field

This invention relates to methods and systems for generating a fuel pulse waveform to control fuel delivery by a fuel injector into an engine utilizing either angle or time domain scheduling and supporting dynamic changes in the fuel output.

2. Background Art

Electronic processors, or controllers, are often utilized to control various aspects of physical systems. Such processors receive information from the physical system, process the information and generate one or more control signals to control certain aspects of the operation of the physical system. Although such processors allow a great deal of information to be processed in a brief period of time, certain physical systems, by virtue of their complexity and speed of operation, impose significant demands on such processors to generate accurate control signals in response to rapidly changing conditions.

In controlling fuel injectors of a vehicle's engine, the processor must monitor the amount of fuel injected into the cylinders. This is important to both the operator of the vehicle as well as the processor which is trying to efficiently control injection. Since fuel injectors today are not capable of turning on or off instantly in time, during the time that the injector is turning on or off some amount of fuel is still injected into the cylinder. If a fuel injector is in the process of turning off and is turned back on before it had an opportunity to turn completely off, the processor will lose track of the actual amount of fuel injected.

In addition, if a fuel injector is allowed to remain open across an engine cycle boundary, excess fuel is injected into the cylinder but is not ignited during the engine cycle for which it was intended. Therefore, the programmer may not be able to determine the exact amount of fuel ignited in the cylinder during the engine cycle and may miscalculate the amount of fuel needed in the next cycle. Inaccurate information regarding the amount of fuel injected in the first engine cycle adversely effects fuel economy and exhaust emissions.

The known prior art includes a processor having a dynamic output stack, as shown in FIG. 1. The output stack includes a plurality of non-memory mapped Random Access Memory (RAM) arrays 10 each having a command portion 10a and a time value portion 10b. The command portion 10a is directly coupled to a demultiplexer 11. The time value portion 10b is directly coupled to a comparator 12 whose output is coupled to the demultiplexer 11. A programming register 13 is used to determine which RAM array 10 is to be selected by the demultiplexer 11. Several external events can then be triggered using the system of the prior art. Once an output event is executed, the output item is deleted from the stack. Thus, processor intervention is constantly required to attend the hardware to maintain output pulses. Thus, the known prior art fails to disclose a method and system for accurately generating a fuel pulse waveform with minimum processor intervention.

DISCLOSURE OF THE INVENTION

A general object of the present invention is to provide a method and system for accurately generating a fuel pulse waveform while minimizing processor intervention.

In carrying out the above object and other objects, features and advantages, of the present invention, a method is provided for generating a fuel pulse output signal. The method includes the step of providing a plurality of memory-mapped holding registers adapted to asynchronously receive a plurality of fuel pulse data from a processor and for storing the plurality of fuel pulse data until subsequent fuel pulse data is received from the processor. The method also includes the step of providing a plurality of match registers coupled to the plurality of holding registers for comparing the fuel pulse data with a reference signal. The method further includes the step of generating the fuel pulse output signal based on the comparison between the fuel pulse data and the reference signal.

In further carrying out the above object and other objects, features and advantages, of the present invention, a system is also provided for carrying out the steps of the above described method. The system includes a plurality of holding registers adapted to asynchronously receive a plurality of fuel pulse data from a processor. The system also includes a plurality of match registers coupled to the plurality of holding registers for comparing the fuel pulse data with a reference signal and for generating the fuel pulse output signal based on the comparison between the fuel pulse data and the reference signal. Still further, the plurality of holding registers are memory mapped and store the plurality of fuel pulse data until subsequent fuel pulse data is received from the processor.

The above object and other objects, features and advantages of the present invention are readily apparent from the following detailed description of the best mode for carrying out the invention when taken in connection with the accompanying drawings.

BRIEF DESCRIPTION OF THE DRAWINGS

FIG. 8 is a diagram of the Fuel Integrated Channel Control Register 0;

FIG. 9 is a diagram of the Fuel Integrated Channel Control Register 1;

FIG. 10 is a diagram of the Fuel Integrated Channel Status Register;

BEST MODES FOR CARRYING OUT THE INVENTION

Figure 1:
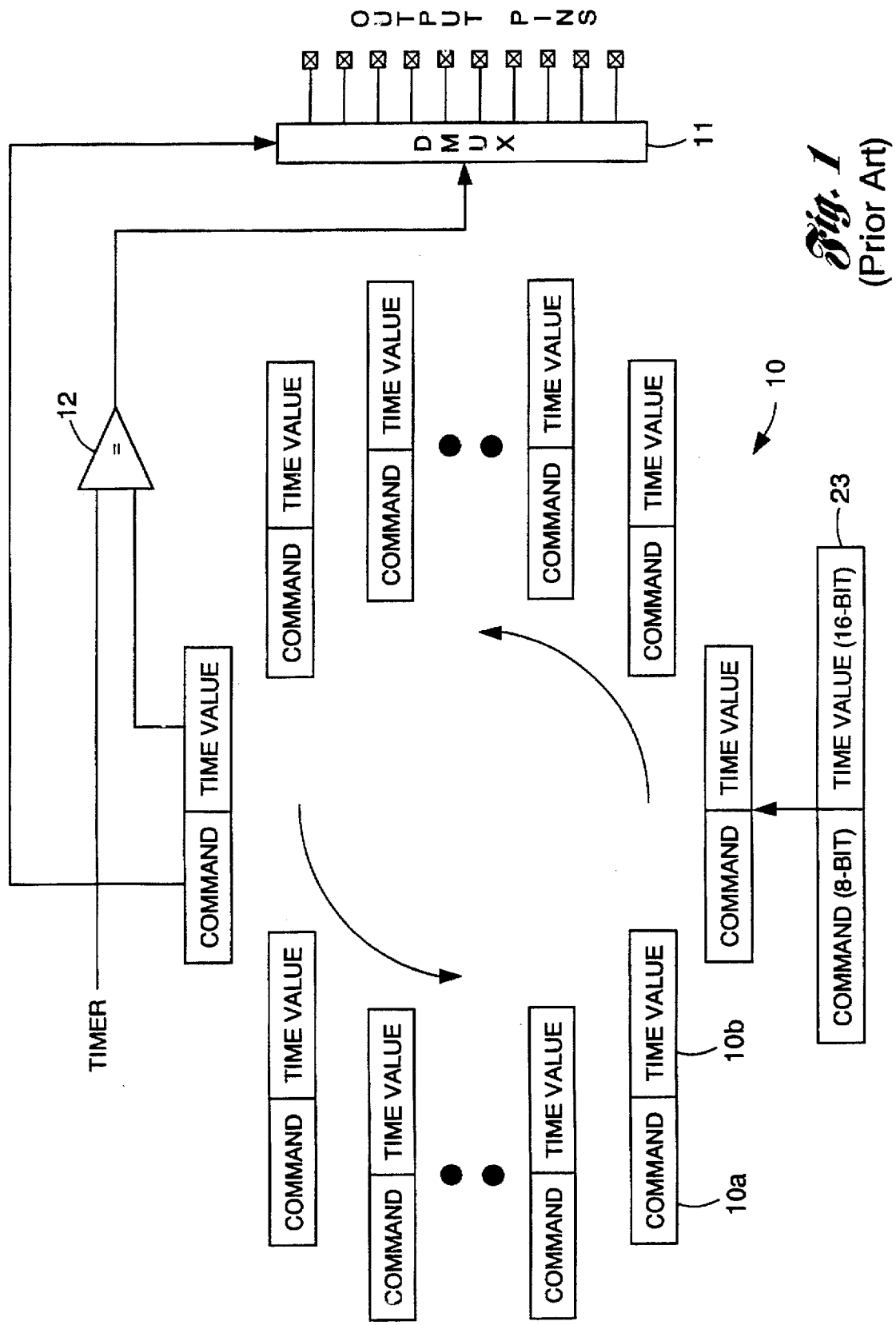
FIG. 1 is a block diagram of a prior art processor hardware used to generate a fuel pulse waveform.
Figure 2:
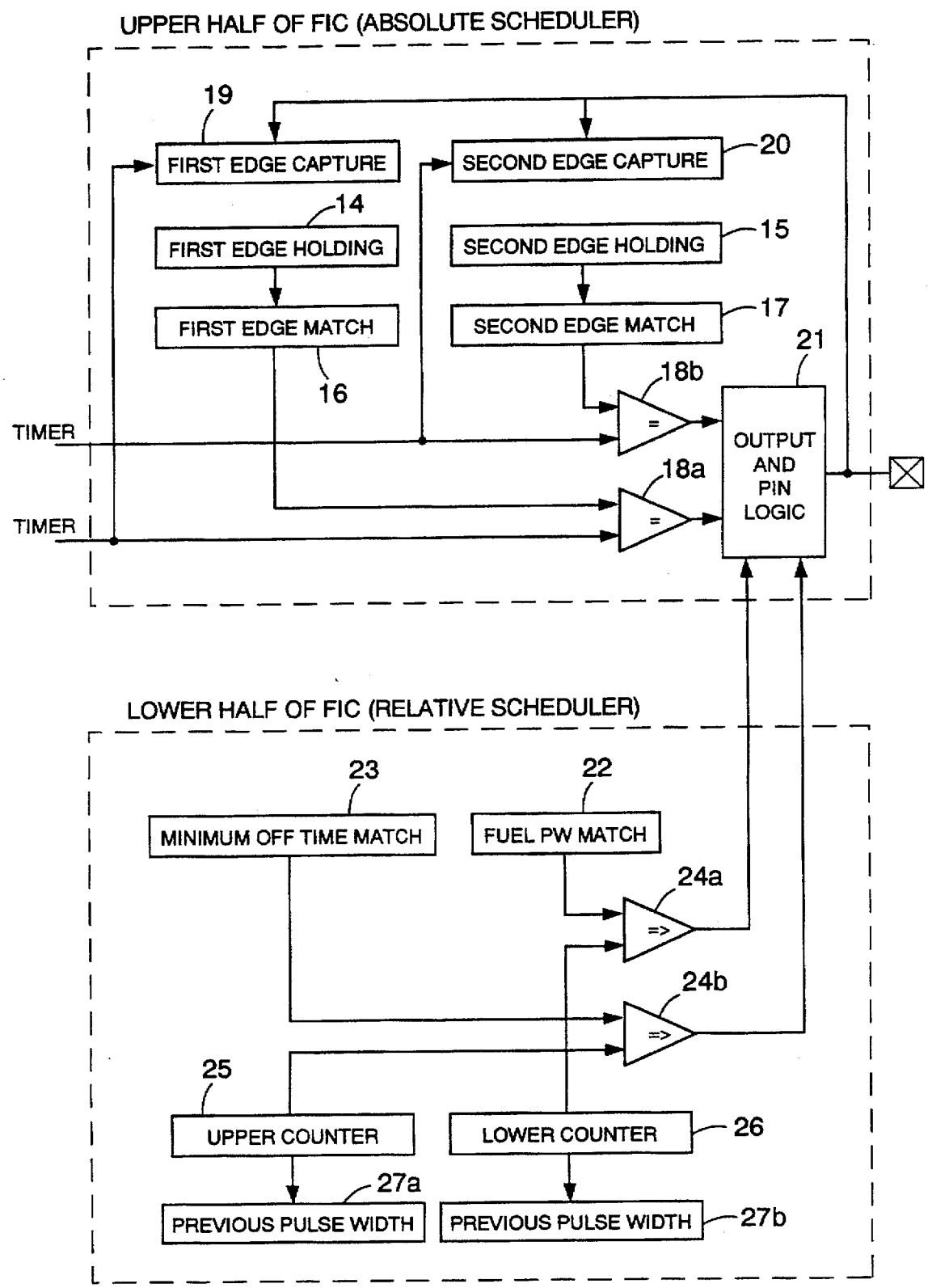
FIG. 2 is a general block diagram of a processor hardware of the present invention for generating the fuel pulse waveform.

Turning now to FIG. 2, there is shown a simplified block diagram of a processor hardware of the Fuel Integrated Channel (FIC) of the present invention for generating a fuel pulse waveform. The hardware includes a first edge holding register 14 and a second edge holding register 15 for receiving fuel pulse edge data from a command register (not shown). The fuel pulse edge data contained in the first edge holding register 14 and the second edge holding register 15 are transferred to a first edge match value register 16 and a second edge match value register 17, respectively. The first edge holding register 14 and the second edge holding register 15 allow the processor to asynchronously load values for the next pulse event. The output of the first edge holding register 14 and the second edge holding register 15 are each coupled to a comparator 18a,18b for comparing the fuel pulse edge data with a reference signal and for generating a fuel pulse output signal based on the comparison between the fuel pulse edge data and the reference signal. The reference signal may be either a timebase signal or an angle signal. The FIC also includes a first edge capture register 19 and a second edge capture register 20 for capturing the time of each edge of the fuel output pulses. Still further, the FIC includes an output logic 21 for generating the appropriate output pulse.

The first edge holding register 14 and the second edge holding register 15 are memory-mapped and store the fuel pulse edge data until subsequent fuel pulse edge data is received from the processor, thus minimizing processor intervention. The same fuel pulse can then be produced until engine conditions change in which the processor transfers new fuel pulse edge data to the holding registers 14,15. This portion of the FIC can be logically thought of as an absolute scheduler.

The upper half of the FIC contains a relative scheduler, which is relative to the events produced from the first edge match register 16 and the second edge match register 17. This hardware includes a Fuel Pulse Width (PW) register 22 and a Minimum Off Time register 23. The fuel pulse data is contained in the Fuel PW register 22 and the Minimum Off Time register 23. The outputs of the Fuel PW register 22 and the Minimum Off Time register 23 are each coupled to an independent greater-than or equal-to comparator 24a, 24b for comparing the fuel pulse data with the local reference signal generated by an upper counter 25 and a lower counter 26. The Fuel PW data is compared to the lower counter 26 as a result of a pin transition from off to on. The lower counter 26 only counts while the pin is in the on state or while an injector is being driven to its on condition in which fuel is flowing. The Minimum Off Time data is compared to the upper counter 25 as a result of a pin transition from on to off. The upper counter 25 only counts while the pin state is in the off state or while the injector is being driven to its off condition in which fuel is not flowing.

The FIC also includes a pair of previous pulse width registers 27, 27b for transferring the value of the counters when events from the fuel PW register 22 occur. The previous pulse width register 27a, 27b is a means for the processor to obtain information on the exact amount of fuel that was delivered to the cylinder during a particular fuel pulse.

Figure 3:
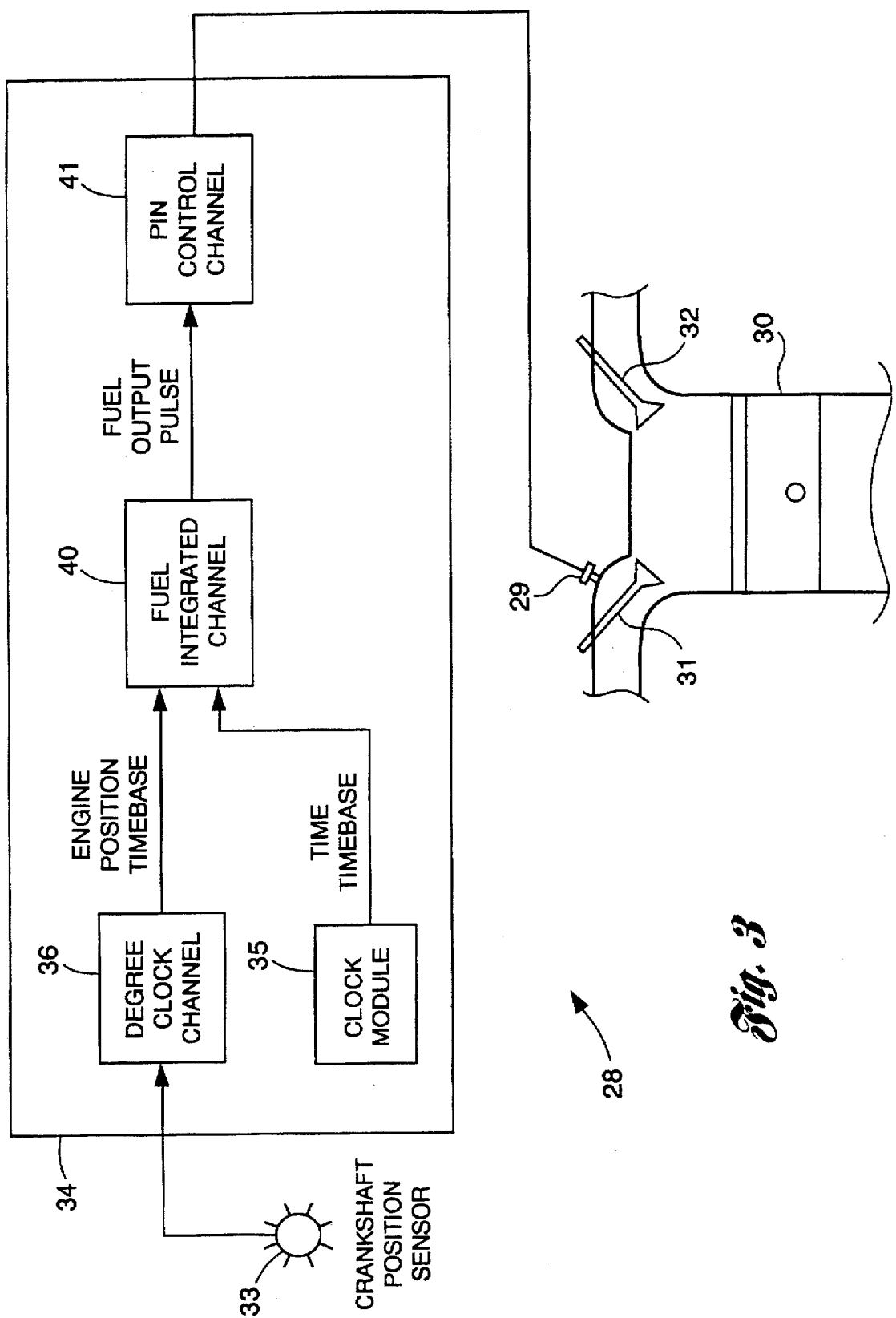
FIG. 3 is a schematic diagram of a fuel injection system incorporating the present invention.

Turning now to FIG. 3, there is shown a simplified schematic diagram of a fuel injector system, denoted generally by reference numeral 28, incorporating the present invention. Under normal operating conditions, fuel is delivered from a fuel source (not shown) through fuel lines (not shown) to at least one fuel injector or actuator 29. The fuel injector 29 is conventional and injects fuel from the fuel lines into at least one individual cylinder 30 of an internal combustion engine (not shown) of an automotive vehicle (not shown). The cylinder 30 also has one or more intake valves 31 and one or more exhaust valves 32 which are typical. Fuel from the fuel injectors 29 is mixed with air in the cylinders 30 in a known manner.

A typical crankshaft position sensor 33 is provided for generating an engine position in an angle domain. The sensor 33 and fuel injector 29 are electrically connected to an electronic control unit (ECU) 34, or processor, including a clock module 35 for providing a time timebase and a degree clock channel 36 for providing an angle timebase. The ECU 34 further includes a Fuel Integrated Channel (FIC) module 40 for determining the fuel output pulse. A Pin Control Channel 41 is included in the ECU 34 for determining whether a pin line and/or status line is configured to be driven. The ECU 34 then generates an output signal to control the fuel injectors 29 based on the fuel output pulse determined by the FIC 40.

Figure 4:
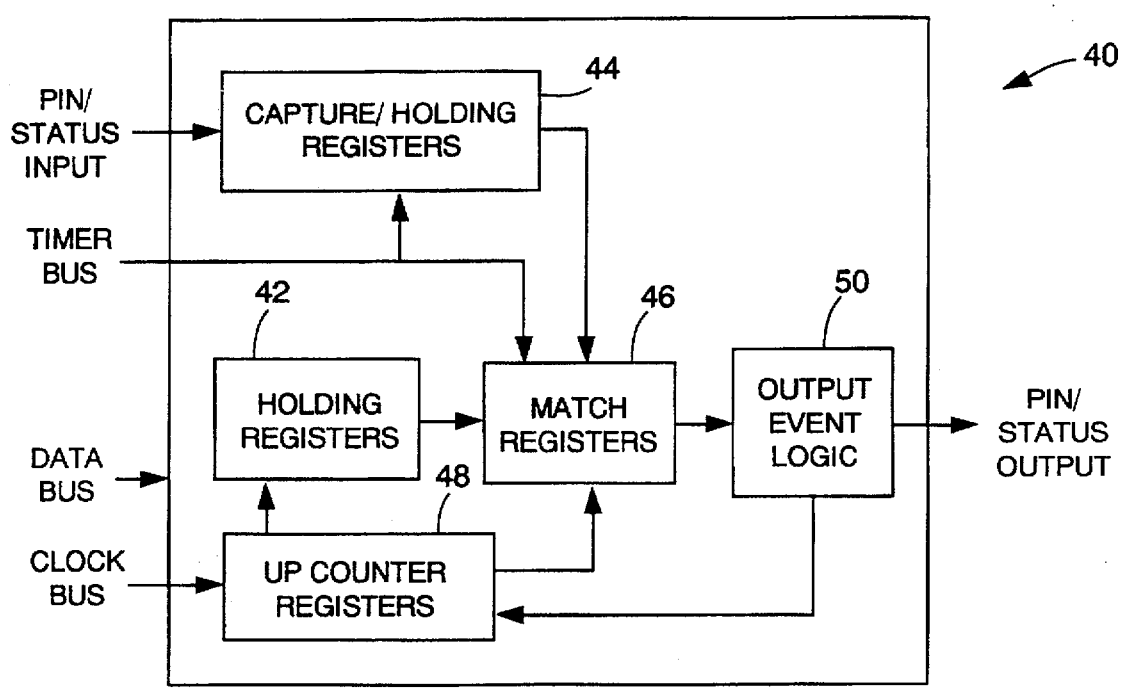
FIG. 4 is a simplified block diagram of the Fuel Integrated Channel of the present invention.
Figure 5:
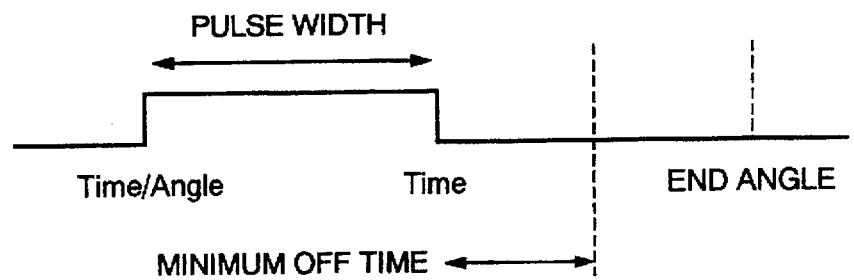
FIG. 5 is a waveform of a typical fuel output pulse.

Referring now to FIG. 4, there is shown a simplified block diagram of the FIC 40. The FIC 40 supports two modes of operation: fuel mode and Pulse Width Modulation (PWM) mode. In the fuel mode, the FIC 40 produces pulses based on engine angle and time. These pulses may be continuously produced without processor intervention between pulses. Fuel pulses are normally specified by a first edge time or angle, a pulse width, a minimum pulse off time, and an end of engine cycle (end angle). A typical fuel output pulse is shown in FIG. 5.

Figure 6:
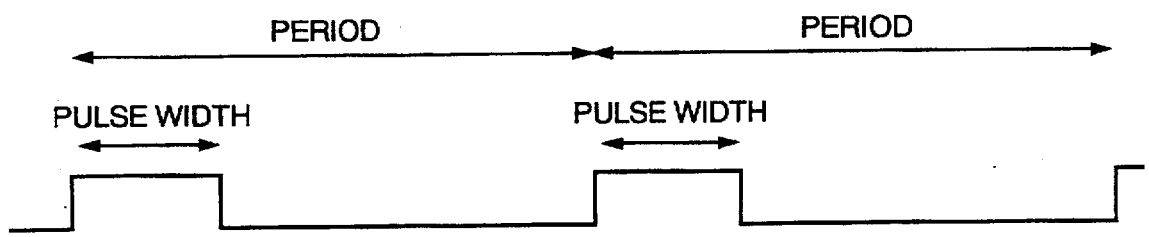
FIG. 6 is a waveform of a typical Pulse Width Modulation output.

In the PWM mode, the FIC 40 can produce up to two outputs, each with a continuous stream of periodic output pulses without processor intervention between pulses. Both outputs may be programmed independently. PWM pulses are generated by a period value and a pulse width value which define the pulse frequency and duty cycle. FIG. 6 illustrates a typical PWM output waveform. This mode also supports 0% and 100% duty cycle output pulses. Coherent transitions to fuel mode or from fuel to PWM mode are not supported. The FIC 40 should be cleared before it can operated in the new mode.

The FIC 40 provides the capture, match and counting functions necessary to support and produce fuel pulses as will be described in detail below. Each edge of the pulse may be specified in time or angle and may be buffered to insure coherent output pulse changes from one pulse to another. Pulse edges may also be captured as a programmable time or degree timebase.

The FIC 40 is composed of several registers. The FIC 40 includes holding registers 42 for storing the duration in time of the most recent fuel pulse. This information is especially useful when the end of an engine cycle has been exceeded and the amount of fuel ignited in the cylinder 30 is less than the amount of fuel requested by the ECU 34. In this instance, the ECU 34 need only read the holding register 42 to obtain the actual duration of the fuel pulse.

The FIC 40 also includes capture/holding registers 44 for capturing a time or angle timebase value when triggered by pin transitions. The capture/holding registers 44 may be enabled for single captures or enabled for continuous captures. The FIC 40 further includes match registers 46 for generating the output waveform and up counter registers 48 for providing a local timebase incremented by a clock. The value in an up counter register 48 is compared against the value in a match register 46 to produce timed output events. The output event logic 50 controls the mode and operation of the channel and controls the destination of all output events.

Figure 7:
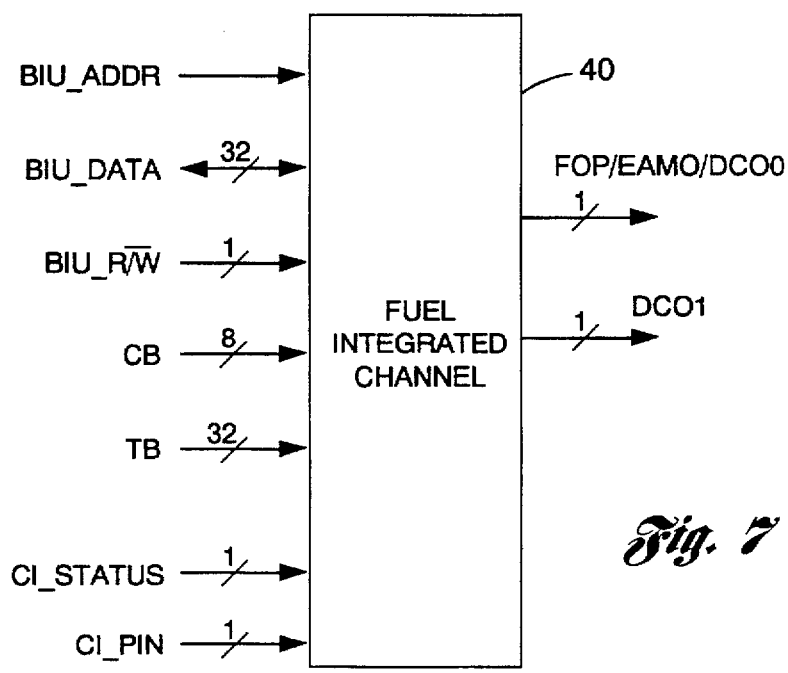
FIG. 7 is a schematic diagram illustrating the input and output signals associated with the Fuel Integrated Channel of the present invention.

The relevant input and output signals associated with the FIC 40 are shown in FIG. 7. The Bus Interface Unit Address Bus (BIU_ADDR) is used to select the appropriate register. The Bus Interface Unit Data Bus (BIU_DATA) is a 32-bit bus used to transfer data to and from the registers of the FIC 40 by a bus master during a write and a read cycle, respectively. Data can be accessed in byte (8-bit), half-word (16-bits), and word (32-bits) formats. The Bus Interface Unit Read/Write Signal (BIU_R/W) is generated by the bus master to indicate that either a read or a write operation is in progress.

The Clock Bus (CB) contains eight different clock sources which can be individually selected for use by the FIC 40. The Timer Bus (TB) supplies eight different 16-bit or 32-bit timebases to the FIC The eight different timebases are multiplexed onto the bus during individual time slots. Assignment of different timebases to the eight time slots is controlled by the Timer Bus Control Channel.

The Capture input Pin Line (CI_PIN) is an input to the FIC 40 from a hardwired input state pin. The CI_PIN reflects the state of the pin driven by a fuel output pulse (FOP) signal and is responsible for triggering captures in the FIC 40 based on the OEDC0 bit field, as will be described below. The Capture Input Status Line (CI_STATUS) is an input to the FIC 40 from a hardwired input status line. The CI_STATUS reflects the state of the status line driven by the fuel output pulse (FOP) signal or an end angle match output (EAMO) and is responsible for triggering captures in the FIC 40 based on the OEDC0 bit field.

The output signals include a Fuel Output Pulse/End Angle Match Output/Duty Cycle Output 0 (FOP/EAMO/DCO0) signal and a Duty Cycle Output 1 (DCO1) signal. The FOP/EAMO/DCO0 signal is a fuel output pulse signal and an end angle match output in fuel mode and is the first (PWM0) duty cycle output pulse in PWM mode. This signal is hardwired (mask programmed) to one pin and one status bus line. These pin and status lines are given only as examples. However, it is programmed to drive either the pin line or the status line, but not both. If the fuel mode FOP is configured to drive the pin line, then the EAMO is configured to drive the status line. If the FOP is configured to drive the status line then the EAMO is disabled. The EAMO is also disabled in PWM mode. The EAMO is driven upon one of two conditions. In one case, the EAMO signal is driven upon all End Angle Match events. In the second case, the EAMO is driven whenever the amount of fuel delivered is less than the amount of fuel requested, i.e. the engine cycle completes before all the requested fuel has had an opportunity to be injected. Unlike the other outputs, the edge driven to the output event bus on the EAMO is not programmable. The EAMO is a toggle only output event.

The DCO1 signal is the second (PWM1) duty cycle output pulse in PWM mode. This signal is hardwired (mask programmed) to the pin bus line and the status bus line. These pin and status lines are given only as examples. However, it is programmed to drive either the pin line or the status line, but not both.

The FIC 40 is composed of ten 16-bit data registers, one 32-bit data register, two 32-bit control registers and a 32-bit status register. The data registers the FIC 40 contains are two 16-bit capture/holding registers, two 16-bit equal-to match registers, two 16-bit holding registers, one 32-bit holding register, two 16-bit (or one 32-bit) greater-than-or-equal-to match registers, and two 16-bit (or one 32-bit) up counter registers. A Memory Map associated with the FIC 40 for the Fuel Mode is shown as follows:

|       | 0             | 15 | 16       | 31 |
|-------|---------------|----|----------|----|
| $X0  | Unimplemented |    |          |    |
| $X4  | FIC_CR0       |    |          |    |
| $X8  | FIC_CR1       |    |          |    |
| $XC  | Unimplemented |    |          |    |
| $X10 | Unimplemented |    |          |    |
| $X14 | FIC_SR        |    |          |    |
| $X18 | FIC_UCNT      |    | FIC_LCNT |    |
| $X1C | FIC_FEC       |    | FIC_SEC  |    |
| $X20 | FIC_FEM       |    | FIC_EAM  |    |
| $X24 | FIC_NFE       |    | FIC_NFP  |    |
| $X28 | FIC_MOTM      |    | FIC_FPM  |    |
| $X2C | FIC_PFPW      |    |          |    |
| $X30 | Unimplemented |    |          |    |
| $X34 | Unimplemented |    |          |    |
| $X38 | Unimplemented |    |          |    |
| $X3C | Unimplemented |    |          |    | where,
FIC_CR0,1: Control Registers 0 and 1
FIC_SR: Status Register
FIC_UCNT: Upper Counter
FIC_LCNT: Lower Counter
FIC_FEC: First Edge Capture
FIC_SEC: Second Edge Capture
FIC_FEM: First Edge Match
FIC_EAM: End Angle Match
FIC_NFE: Next First Edge
FIC_NFP: Next Fuel Pulse
FIC_MOTM: Minimum Off Time Match
FIC_FPM: Fuel Pulse Match
FIC_PFPW: Previous Fuel Pulse Width The X is the high order address that specifies a particular modules' address space in the memory map. Addresses shown are only intended to show the size and relative position of the registers.

A Memory Map associated with the FIC 40 for the PWM mode is as follows:

|       | 0             | 15 | 16       | 31 |
|-------|---------------|----|----------|----|
| $X0  | Unimplemented |    |          |    |
| $X4  | FIC_CR0       |    |          |    |
| $X8  | FIC-CR1       |    |          |    |
| $XC  | Unimplemented |    |          |    |
| $X10 | Unimplemented |    |          |    |
| $X14 | FIC_SR        |    |          |    |
| $X18 | FIC_UCNT      |    | FIC_LCNT |    |
| $X1C | FIC_NPR0      |    | FIC_NPR1 |    |
| $X20 | FIC_PRM0      |    | FIC_PRM1 |    |
| $X24 | FIC_NPU0      |    | FIC_NPU1 |    |
| $X28 | FIC—PUM0      |    | FIC_PUM1 |    |
| $X2C | N/A           |    |          |    |
| $X30 | Unimplemented |    |          |    |
| $X34 | Unimplemented |    |          |    |
| $X38 | Unimplemented |    |          |    |
| $X3C | Unimplemented |    |          |    | where,
FIC_CR0,1: Control Registers 0 and 1
FIC_SR: Status Register
FIC_UCNT: Upper Counter
FIC_LCNT: Lower Counter
FIC_NPR0: Next Period 0
FIC_NPR1: Next Period 1
FIC_PRM0: Period Match 0
FIC_PRM1: Period Match 1
FIC_NPU0: Next Pulse 0
FIC_NPU1: Next Pulse 1
FIC_PUM0: Pulse Match 0
FIC_PUM1: Pulse Match 1

The registers of the FIC 40 are named based on the primary purpose of the registers in each mode. Each data register is individually programmable and can, therefore, perform other functions besides the registers' primary function. For example, FIC_MOTM, Minimum Off Time Match is named as such since it supports the minimum off time operation in fuel mode. However, this register is general purpose and may perform other types of greater-than-or-equal-to match functions. Descriptions of the data, control and status registers follow the memory maps, including the complete programmer's model for the control and status registers.

The following is a detailed explanation of the data registers in the memory map of the FIC 40. There are five different types of data registers in the FIC 40: the Capture/Holding register, the Equal-To Match register, the Holding register, the Greater-Than-or-Equal-To-Match register, and the Up Counter register. All registers are 16-bit except one of the holding registers which is 32-bits and the greater-than-or-equal-to-match registers and the up counter registers which are 16/32-bit registers. Any two adjacent 16-bit registers (i.e. First Edge Capture and Second Edge Capture) may be accessed simultaneously as one 32-bit word.

In fuel mode, the Capture/Holding registers function as two 16-bit capture registers, First Edge Capture and Second Edge Capture. These registers capture time or degree timebases when triggered by pin transitions and may be enabled for single captures or enabled for continuous captures. When the FIC 40 is configured for continuous captures and at least one match output is enabled, each capture register captures upon it's specified edge transition of a hardwired (mask programmned) input pin (or status) state bus line. For example, if the First Edge Capture register is configured to capture rising edge pin transitions, then each rising edge occurrence on the hardwired (mask programmed) input state bus triggers a capture, provided that at least one match output is enabled. When the FIC 40 is configured for single captures and at least one match output is enabled, each capture register may capture at most one time or degree timebase.

In PWM mode, the capture function is disabled and the registers function as two 16-bit holding registers and are called Next Period 0 and Next Period 1. They provide future values for the two PWM periods and are triggered to transfer data to the Period Match 0 and Period Match 1 registers upon Period Match 0 and Period Match 1 match events, respectively.

The primary role of the equal-to match registers and their comparators in the FIC 40 is to determine precise timing of output events (this is conditional on several control bit fields). In fuel mode, an equal-to match comparator asserts that a match event has occurred when the value that the register holds is equal to the value of the time or degree timebase it is being compared against, resulting in a rising, falling or toggle edge output event. In PWM mode, an equal-to match register is compared against one of the counters in the FIC 40, not a time or degree timebase from the Timer Bus. The equal-to match comparator only asserts a match event when the values are equal. The data contained in these registers may be loaded from the two holding registers upon an End Angle Match or by a bus master write. When loaded by a bus master write or by a transfer from the two holding registers, either register may be accessed as a 16-bit half-word or both may be accessed as a single 32-bit word.

Each of the two equal-to match registers has a match interlock in fuel mode. When an equal-to match register asserts a match event, it becomes "interlocked". An interlocked match register may not assert further match events until the interlock has been broken. In the FIC 40, an equal-to match interlock may be broken by any one of the following ways: a false compare (timebase value does not equal the match register value during a compare), or the match register is disabled, reset, or upon channel disable.

In the FIC 40, the two equal-to match registers will not both generate output events when they match simultaneously in fuel mode. Either the First Edge Match or the End Angle Match register is responsible for generating the output event when they match at the same time. Which register produces the output event is dependent on the DOME bit field as described below.

In PWM mode, the equal-to match registers are called Period Match 0 and Period Match 1. In this mode, the equal-to match registers always match against the up counters, not the Timer Bus. In this case, the data contained in these registers may be loaded from the Capture/Holding registers or by a bus master write.

In fuel mode, the Next First Edge and Next Fuel Pulse registers operate as holding registers. These registers transfer data to two of the four match registers as programmed, upon an End Angle Match event.

In PWM mode, the Next Pulse 0 and Next Pulse 1 registers operate as holding registers. These registers transfer data to the Pulse Match 0 and Pulse Match 1 registers upon Period Match 0 and Period Match 1 events, respectively.

The FIC 40 also supports one 32-bit holding register, Previous Fuel Pulse Width, in fuel mode. This register is transferred data from the Up Counter registers upon second edge output events. If the FIC 40 is in 32-bit operation, the entire contents of the Up Counter is transferred to Previous Fuel Pulse Width. If the FIC 40 is in 16-bit operation, only the lower 16-bits of the Up Counter, Lower Counter, is transferred to Previous Fuel Pulse Width. In 16-bit operation, the upper half-word of Previous Fuel Pulse Width is always driven to $0000 upon second edge output events. This data transfer is subject to single/continuous captures as well.

In PWM mode, the Previous Fuel Pulse Width holding register is disabled from being updated by Up Counter transfers.

The Minimum Off Time Match and the Fuel Pulse Match registers hold values that are compared against the values in the Up Counter registers with greater-than-or-equal-to comparators. These comparators perform an unsigned 16-bit greater-than-or-equal-to comparison, allowing for a compare value up to $2^{16}-1$. If the value of the Up Counter is greater-than-or-equal-to the value in the match register, a match event occurs. Both the match registers and the comparators may also be configured in fuel mode as a single 32-bit match register and a single 32-bit comparator, respectively. The 32-bit comparator performs an unsigned 32-bit greater-than-or-equal-to comparison, allowing for a compare value up to $2^{32}-1$.

In fuel mode, the data contained in the Minimum Off Time Match and Fuel Pulse Match registers may be loaded from the two holding registers upon an End Angle match event, or by a bus master write. When loaded by a bus master write or by a transfer from the two holding registers, either register may be accessed as a 16-bit half word or both may be accessed as a single 32-bit word.

The greater-than-or-equal-to comparators have three conditions that must be met in order to be enabled in fuel mode. There are two software conditions and one hardware condition. First, a greater-than-or-equal-to match register must be enabled to produce an output event. Secondly, if the up counter that the match register value is compared against is stopped, comparisons are inhibited. This is necessary to ensure that a spontaneous match is not asserted if a new match or counter value is written. Comparisons are resumed when the counter stop bit is cleared.

The third condition to enable greater-than-or-equal-to match comparisons is a hardware condition. Each greater-than-or-equal-to match register value is compared against an up counter which is enabled on a programmed level of the output pulse, FOP. In order to provide support for coherent mode changes, comparisons are enabled by the edge driven on Fuel Output Pulse (FOP) which produces the level that enables the up counter. For example, if an up counter is programmed to be enabled to increment when the output is high, the match register that it is compared against is only enabled when both software conditions are met, and when a rising edge is driven on FOP. The match operation is subsequently disabled when either the Fuel Output Pulse (FOP), is driven low, or the match register asserts a match event (whichever occurs first). Without this hardware condition, the FIC 40 cannot guarantee clean operation out of reset and during some mode changes.

In PWM mode, the registers may be loaded as 16-bit half words upon Period Match 0 and Period Match 1 events, or by a bus master write. When accessed by a bus master write, either register may be accessed as a 16-bit half word or together may be accessed as a single 32-bit word.

In PWM mode, the greater-than-or-equal-to match registers are called Pulse Match 0 and Pulse Match 1, and although they perform different functions, they operate in the same manner as fuel mode except that they are always enabled as long as the Match Output Edge (MOE) bit field is not cleared and the counter stop (CSTU or CSTL) bit is not set. Since the match registers are always enabled during the course of operation in PWM mode, they are not disabled upon an output level transition, or a match event. Each of the two greater-than-or-equal-to match registers has a match interlock in PWM mode. When a greater-than-or-equal-to match register asserts a match event, it becomes "interlocked". An interlocked match register may not assert further match events until the interlock has been broken. In the FIC 40, a greater-than-or-equal-to match interlock may be broken by any one of the following ways: a false compare (timebase value does not equal the match register value during a compare), the match register is disabled, a bus master write to the match register, a data transfer to the match register, reset, or upon disabling of the FIC 40.

The Up Counter registers provide a local timebase incremented by one of eight different clocks from the Clock Bus. The value in an Up Counter is compared against the value in a match register to produce timed output events.

In fuel mode, the Upper Counter compares against the Minimum Off Time Match register and the Lower Counter compares against the Fuel Pulse Match register. The up counters are configured by software to be enabled on output levels (e.g. output level high). A counter becomes enabled in two possible ways. The first way assumes the counter is already configured to count on a specific output level (e.g. output level high). When the output level transitions from low to high, the counter is enabled and cleared and begins to increment. The second way assumes the counter is initially disabled to count regardless of the output level. If the output level is high and the counter is then configured to count while the output is high, the counter is immediately enabled and cleared and begins to increment. The counter is subsequently disabled when either the output level changes or the match register asserts a match event, whichever occurs first. A counter may be enabled but not cleared when the channel is being re-enabled after it had been disabled by the Disable On Match Event bit field.

The up counters are also cleared upon being enabled in the manner described above, provided the counter has not been stopped in software and the channel is not being re-enabled. In addition, the counters (Lower Counter only in sixteen bit mode) are also cleared upon First Edge Match events whenever a First Edge Match event occurs simultaneously with an End Angle match in continuous operation fuel mode (DOME is cleared). After a clear due to these coincident match events the counter resumes counting if enabled by input level as described above. This ensures automatic transition into and out of full-on operation.

In fuel mode, although the counters are enabled on output levels during the course of normal operation, they are always disabled out of reset until the output level changes. In other words, a counter that is initialized to count while the output level is low will not increment until a falling edge is driven. This stipulation ensures that the Fuel Pulse Match register doesn't match against the Lower Counter until a First Edge Match output event occurs, and the Minimum Off Time Match register does not match against the Upper Counter until a second edge output event occurs. In addition, upon the Fuel Pulse Match register being disabled by an output level change (i.e. a second edge), the Up Counter transfers its data to the Previous Fuel Pulse Width holding register as described above.

In PWM mode, Upper Counter compares against Period Match 0 and Pulse Match 0, and Lower Counter compares against Period Match 1 and Pulse Match 1. In this mode, the up counters are always enabled. The up counters are cleared on the respective Period Match events.

Control bits are used in the FIC 40 to configure the capture, match, holding and counter registers as well as the input and output event logic of the FIC 40. As a result these bits control capture events, match events, output events, counting events and data transfers within the FIC 40.

Status bits are used to signal the occurrence of various types of events within the FIC 40. Only the hardware of the FIC 40 can assert a status bit. Writing the asserted state to a status bit has no effect. To negate a status bit, it must be read in the asserted state, and the negated value written back to the bit. This method is termed the "standard mechanism". If the channel event which sets the status bit occurs between the time that the CPU reads the status and then negates the bit to clear it, the status bit remains asserted. This indicates that a new status event has occurred and that the CPU has not read from the register. In addition, to the control and status bits, there are read-only flag bits which reflect channel status but are both cleared and set by the hardware and not by the CPU.

The FIC 40 has two 32-bit control registers and a 32-bit status register that contain the control and status bit fields. FIG. 8 illustrates the bit field encoding of the Fuel Integrated Channel Control Register 0, its reset states and in ambiguous cases, the data register to which the bit field refers, where:

| | |
|---|---|
| FECTB: | First Edge Capture Timebase |
| SECTB: | Second Edge Capture Timebase |
| FEMTB: | First Edge Match Timebase |

-continued

| | |
|---|---|
| EAMTB: | End Angle Match Timebase |
| 12/16U: | 12/16-bit Match Upper (FEM) |
| 12/16L: | 12/16-bit Match Lower (EAM) |
| | 0 - 16-bit matches |
| | 1 - 12-bit matches |
| DOME: | Disable On Match Event |
| | 0 - no effect |
| | 1 - disable FIC upon an End Angle |
| SCC: | Single/Continuous Captures |
| | 0 - continuous captures |
| | 1 - single capture |
| CSTU: | Counter Stop Upper (UCNT) |
| CSTL: | Counter Stop Lower (LCNT) |
| | 0 - no effect/resume incrementing |
| | 1 - stop and hold counter/disable match register |
| CLKU: | Clock Upper (UCNT) |
| CLKL: | Clock Lower (LCNT) |
| | 000 - System Clock / 2 |
| | 001 - 4 MHz (crystal frequency) |
| | 010 - Engineering Clock (1 MHz) |
| | 011 - Engineering Clock / 4 |
| | 100 - Engineering Clock / 16 |
| | 101 - Engineering Clock / 1024 |
| | 110 - Filtered CPS tooth event (TIE) |
| | 111 - Degree Clock Ticks (DT) |

FIG. 9 illustrates the bit field encoding of the Fuel Integrated Channel Control Register 1, its reset states and in ambiguous cases, the data register to which the bit field refers, where:

| | |
|---|---|
| CLU: | Counter Level Upper (UCNT) |
| CLL: | Counter Level Lower (LCNT) |
| | 0X - disabled |
| | 10 - count while output is low |
| | 11 - count while output is high |
| TOM: | Transfer on Match (End Angle Match) |
| | 000 - transfers disabled |
| | 001 - only PWM0 transfers enabled |
| | 010 - only PWM1 transfers enabled |
| | 011 - both PWM transfers enabled |
| | 100 - transfer (NFE to FEM) and (NFP to EAM) |
| | 101 - transfer (NFE to FEM) and (NFP to FPM) |
| | 110 - transfer (NFE to MOTM) and (NFP to EAM) |
| | 111 - transfer (NFE to MOTM) and (NFP to FPM) |
| 16/32: | 16/32-bit operation (MOTM/FPM) and (UCNT/LCNT) |
| | 0 - 32-bit operation |
| | 1 - 16-bit operation |
| MOTD: | Minimum Off Time Delay |
| | 0 - MOTD Operation disabled |
| | 1 - provide a minimum off time between an FMP output and a subsequent EAM output event |
| PWM: | Pulse Width Modulation |
| | 0 - Fuel mode enabled |
| | 1 - PWM mode enabled |
| OEDC0: | Output Event Destination Control 0 Fuel MODE |
| | 0 - Drive the fuel output to a hardwired pin event line and the End Angle Match output to a hardwired status event line |
| | 1 - Drive fuel output to a hardwired status event line and do not drive the End Angle Match output |
| | PWM MODE |
| | 0 - Drive the PWM0 output to a hardwired pin event line |
| | 1 - Drive the PWM0 output to a hardwired status event line |
| OEDC1: | Output Event Destination Control 1 |
| | 0 - Drive the PWM1 output to a hardwired pin |

-continued

| | |
|---|---|
| | event line |
| | 1 - Drive the PWM1 output to a hardwired status event line |
| MOEx: | Match Output Edge |
| | 00 - inhibit match events and disable output events |
| | 01 - rising edge |
| | 10 - falling edge |
| | 11 - output toggle |
| EAMOS: | End Angle Match Output Select |
| | 0 - Drive output (EAMO) on each End Angle Match event occurrence |
| | 1 - Drive output (EAMO) only when an End Angle Match event truncates the fuel pulse |
| FMEx: | Force Match Event |
| | 0 - no effect |
| | 1 - force a match event |
| CPIE: | Capture Input Edge |
| | 0 - FEC captures rising input edges SEC captures falling input edges |
| | 1 - FEC captures falling input edges SEC captures rising input edges |
| Res: | Reserved |

FIG. 10 illustrates the bit field encoding of the Fuel Integrated Channel Status Register, its reset states and in ambiguous cases, the data register to which the bit field refers, where:

| | |
|---|---|
| FECF: | First Edge Capture Flag |
| SECF: | Second Edge Capture Flag |
| | 0 - capture has not occurred |
| | 1 - capture has occurred |
| MOF0: | MatchOutput Flag (FEM) |
| MOF1: | Match Output Flag (EAM) |
| MOF2: | Match Output Flag (MOTM) |
| MOF3: | Match Output Flag (FPM) |
| | 0 - match event may have occurred but has been cleared |
| | 1 - match event has occurred |
| IZSU: | Increment to Zero Status Upper (UCNT) |
| IZSL: | Increment to Zero Status Lower (LCNT) |
| | 0 - up counter has not incremented to zero |
| | 1 - up counter has incremented to zero |
| FECS: | First Edge Capture Status |
| SECS: | Second Edge Capture Status |
| | 0 - capture has not occurred |
| | 1 - capture has occurred |
| MOS0: | Match Output Status (FEM/PRM0) |
| MOS1: | Match Output Status (EAM/PRM1) |
| MOS2: | Match Output Status (MOTM/PUM0) |
| MOS3: | Match Output Status (FPM/PUM1) |
| | 0 - match event has not occurred |
| | 1 - match event has occurred |

The following is a detailed description of all the bit fields separated into four broad categories with respect to channel operation: Data Movement, Match Control, Up Counter Control, and Output Event Generation.

Data Movement

The data movement control and status bit fields control the transfer of data between holding and match registers, select the input event edges that trigger captures, select the time or degree timebases associated with the match and capture registers, select single or continuous captures, and provide capture status.

Figure 11:
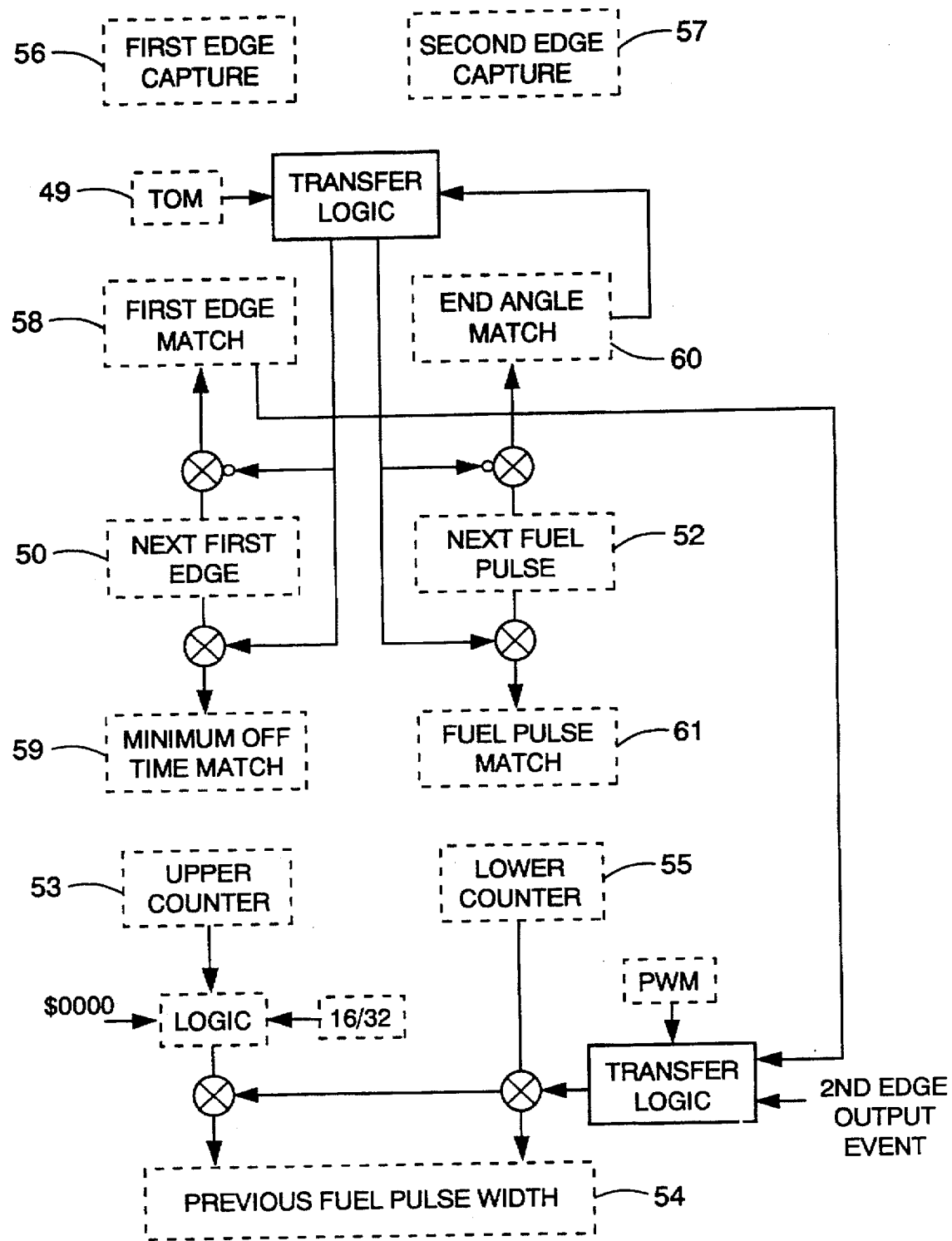
FIG. 11 is a schematic diagram of the data path associated with the fuel mode of the Fuel integrated Channel.
Figure 12:
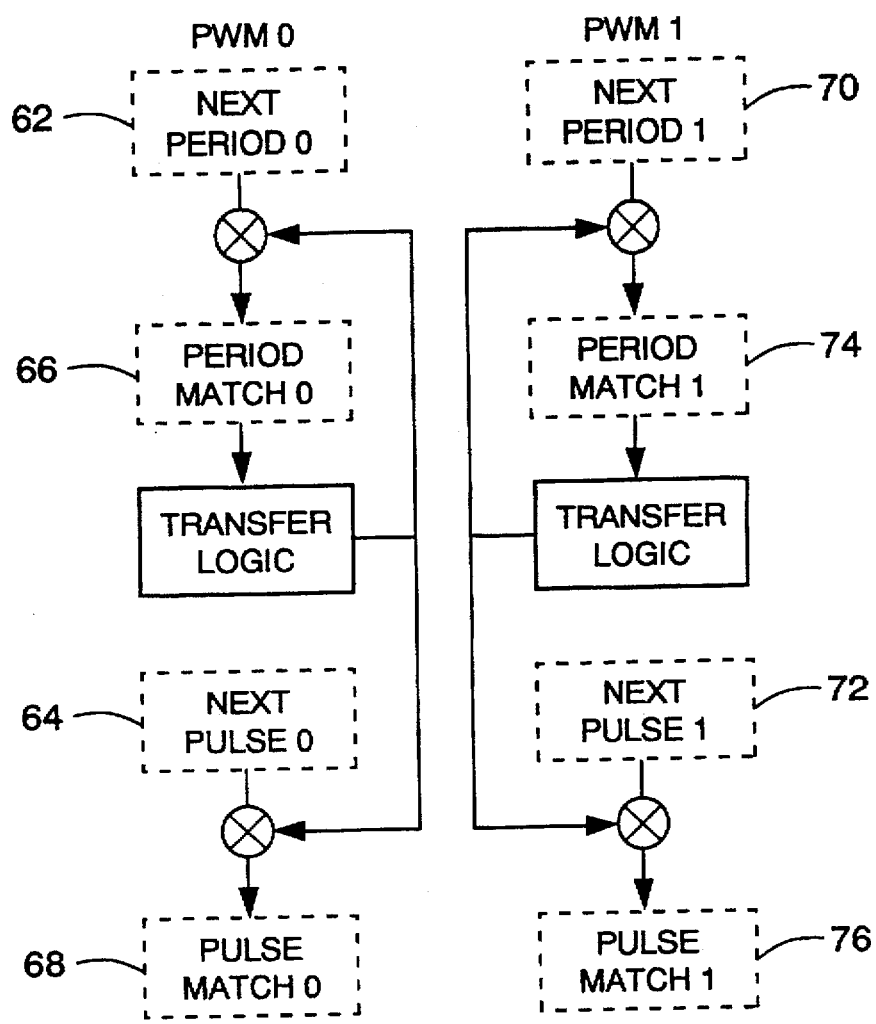
FIG. 12 is a schematic diagram of the data path associated with the PWM mode of the Fuel Integrated Channel.

Several data transfers may occur in the FIC 40. Turning now to FIG. 11, there is shown a schematic diagram of the data path associated with the fuel mode of the FIC 40 while FIG. 12 is a schematic diagram of the data path associated with the PWM mode of the FIC 40. In fuel mode, the Next First Edge and Next Fuel Pulse holding registers 50, 52, respectively, may each be programmed to transfer data to one of two match registers upon an End Angle Match event. In addition, the Up Counter 53 is always configured to transfer its contents to the Previous Fuel Pulse Width holding register 54 upon second edge output events that cause pin transitions or First Edge Match events that occurred simultaneously with End Angle Match events and the pulse width portion of the Up Counter 53 is counting. In 16-bit operation, Lower Counter 55 is transferred to the lower 16-bits of the holding register and $0000 is transferred to the upper 16-bits. In 32-bit operation, the entire contents of the Up Counter 53 is transferred. The Up Counter 53 to Previous Fuel Pulse Width 54 data transfer may be configured to be continuous or single as described in the SCC bit definition below.

The holding registers are named such that they reflect the most common use of the register. For example, in the case of the Next Fuel Pulse register 52, data transfers to the End Angle Match register are supported. This could mean that the Next Fuel Pulse register is transferring a new end angle as opposed to a new pulse width.

The capture function is only supported in fuel mode. The First Edge Capture register 56 and the Second Edge Capture register 57 capture time or degree timebases upon selected edges on the input state bus line. Captures may be configured to be continuous or single as described in the SCC bit definition.

The TOM bit field 49 controls the transfer of data from a holding register to a match register or disables transfers entirely. In fuel mode, the TOM bit field controls the transfer of data from the Next First Edge holding register 50 to either the First Edge Match register 58 or the Minimum Off Time Match register 59. It also controls the transfer of data from the Next Fuel Pulse holding register 52 to either the End Angle Match register 60 or the Fuel Pulse Match register 61. These transfers occur upon End Angle Match events.

In PWM mode, the Next Period 0 holding register 62 and the Next Pulse 0 holding register 64 are configured to always transfer data to the Period Match 0 register 66 and the Pulse Match 0 register 68. This transfer occurs upon a Period Match 0 match event. Likewise, the Next Period 1 holding register 70 and the Next Pulse 1 holding register 72 are configured to always transfer data to the Period Match 1 register 74 and the Pulse Match 1 register 76. This transfer occurs upon a Period Match 1 event.

In PWM mode, the TOM bit field controls the transfer of data from the Next Period 0 holding register 62 and the Next Period 1 holding registers 70 to the Period Match 0 register 66 and the Period Match 1 register 74, respectively. In addition, it controls the transfer data from the Next Pulse 0 holding register 64 and the Next Pulse 1 holding register 72 to the Pulse Match 0 register 68 and the Pulse Match 1 register 76, respectively. These transfers occur upon Period match events. Period Match 0 controls data transfers for PWM0 and Period Match 1 controls data transfers for PWM1.

Bit field encodings 1XX are disabled in PWM mode. If 1XX is written by the CPU in PWM mode, the FIC 40 disables all data transfers. The bit field encodings 001, 010 and 011 are disabled in fuel mode. If either 001, 010 or 011 is written by the CPU in fuel mode, the FIC 40 disables all transfers. The TOM bit field controls transfers independent of the 16/32 configuration. If transfers are triggered by a match event, the data is always transferred based on the TOM encoding, provided the encoding is valid for the current FIC 40 mode (PWM or fuel). TOM is cleared upon reset.

The Capture input Edge bit selects the input event edge that triggers the capture registers to capture a timebase from the Timer Bus. This bit field also provides information on what edge (rising or falling) a first or second edge refers to and thus it must be programmed correctly in order to properly clear the MOF bit fields as well as FECF and SECF. Since PWM mode does not support a capture function, CPIE is disabled in this mode. The CPIE bit is cleared upon reset.

The Capture Timebase bit fields allow independent control of the timebase associated with the capture registers. These bits choose which of the eight timebases on the Timer Bus are captured when triggered by a selected input event edge. The FECTB and SECTB bit fields control the First Edge Capture and the Second Edge Capture registers, respectively. FECTB and SECTB have no effect when the FIC 40 is in PWM mode since captures are not supported in this mode. These bit fields are cleared upon reset.

The Match Timebase bit fields allow independent control of the timebase associated with the equal-to match registers. These bits choose which of the eight timebases on the Timer Bus are compared against the values in the match registers. The FEMTB and EAMTB bit fields control the First Edge Match and the End Angle Match registers, respectively. FEMTB and EAMTB have no effect when the FIC 40 is in PWM mode since the match registers compare against the up counters (UCNT and LCNT). These bit fields are cleared upon reset.

The single/continuous capture bit selects whether only a single timebase capture is performed by each capture register or whether continuous captures may be performed. In addition, this bit selects whether only one data transfer to the Previous Fuel Pulse Width register (PFPW) may be performed.

When set (single capture), SCC first clears the capture status bits (FECS and SECS) and then allows only a single capture from both the First Edge Capture and the Second Edge Capture registers. Also, only one transfer from the Up Counter to PFPW is performed. Each capture register is disabled after it has captured once and sets its capture status bit. The data transfer is disabled immediately after one transfer has occurred due to a second edge output event.

A CPU service using the standard mechanism to clear the FECS and SECS bits, is necessary to re-enable the First Edge Capture and the Second Edge Capture registers (single shot captures). A CPU service using the standard mechanism to clear the SECS bit, is necessary to re-enable the data transfer to PFPW (single shot transfer). Clearing SCC when captures had been disabled immediately re-enables continuous captures and continuous counter to PFPW transfers.

When cleared (continuous captures), multiple captures may be performed by the First Edge Capture and Second Edge Capture registers. Also, multiple data transfers from the Up Counter to PFPW may be performed upon second edge output events or First Edge Match events that occurred simultaneously with End Angle Match events while the pulse width portion of the Up Counter is counting. Since PWM mode does not support a capture function, SCC is disabled in this mode. SCC is cleared upon reset.

The capture status bits, FECS and SECS, are status bits which indicate the occurrence of a First Edge Capture event and a Second Edge Capture event, respectively. A FECS or SECS bit is set upon the occurrence of a capture event and remains set until either SCC is set, or a CPU service using the standard mechanism clears the bit. This CPU service to clear FECS and SECS, is required to re-enable the capture registers when they are configured for single captures (SCC is set). A CPU service to clear SECS is also necessary to re-enable data transfers from the Up Counter to the Previous Fuel Pulse Width holding register when SCC is set. These bit fields are never set in PWM mode. FECS and SECS are cleared upon reset.

The capture edge flag bits, FECF and SECF, are flag bits which indicate the occurrence of a First Edge Capture event and a Second Edge Capture event, respectively. However, the FECF and SECF bits do not act as status bits which require a CPU service to clear. An FECF or SECF bit is set upon the occurrence of a capture event and remains set until the hardware clears it. These bits provide recent status of the capture registers without requiring the CPU to clear them after each capture. Therefore, these bits are read-only to the CPU.

Since the SECF is set upon a second edge capture, it is cleared upon a first edge capture. Since the FECF is set upon a first edge capture, it is cleared upon a second edge capture. DOME has no effect on either the setting or the clearing of these bits.

The FIC 40 uses the CPIE bit to determine which edge (rising or falling) is a first edge and which is a second edge. Therefore, the CPIE bit must be properly configured to guarantee proper FECF and SECF bit operation. In addition, the clearing of these flags are specific to the fuel application so these flags are never set (or cleared) in PWM mode. FECF and SECF are cleared upon reset.

Match Control and Status

The match control and status bit fields control the disabling of the FIC 40, provide match status, enable match events, define the output event edge, force match events, configure the greater-than-or-equal-to comparators for 32-bit operation, and specify the bit length of equal-to comparisons. Match events in the FIC 40 are responsible for triggering data transfers, generating output events which trigger captures, and clearing the up counter registers.

The disable on match event (DOME) bit field selects whether or not the FIC 40 is disabled upon an End Angle Match event while in fuel mode. When cleared, DOME has no effect on channel operation. When set, DOME first clears the MOS1 bit and then configures the FIC 40 to disable the up counter, capture registers, match registers, the FME bits, and all transfers upon an End Angle Match event. DOME disables the FIC 40 only after the effect of an End Angle Match event takes place. Therefore, an output event (FOP and/or EAMO) may be generated, a capture may occur, and a transfer may occur as a result of an End Angle Match event, after which the FIC 40 is disabled. If First Edge Match is equal to End Angel Match and DOME is set, then the End Angle Match takes precedence and First Edge Match does not generate an output edge. The MOS0 status bit will be set and MOF0 will be cleared. The state of the output will be defined by the End Angle Match Edge, i.e. inactive. If First Edge Match is equal to End Angle Match and DOME is clear, then the First Edge Match takes precedence and End Angle Match does not generate an output edge. The MOS1 status bit will be set and MOF1 will be cleared. The state of the output will be as defined by the First Edge Match, i.e. active.

Once disabled, the FIC 40 may be re-enabled by clearing the MOS1 (End Angle Match Status) bit by a CPU service using the standard mechanism (read MOS1 in the asserted state and write it in the negated state), or by clearing DOME. Clearing MOS1 re-enables the FIC 40 to disable itself on the next End Angle match event. Clearing DOME re-enables the FIC 40 to operate continuously (i.e. do not disable on the next End Angle match event).

This bit field allows the FIC 40 to be programmed in a "single-shot" like manner. In this case, single-shot refers to a single engine cycle. The DOME bit field has no effect in PWM mode and is cleared upon reset.

The match output edge (MOE) select bit fields select the type of output event generated for match events and may disable both match and output events. These bit fields also enable the capture function in fuel mode. A match register is disabled when its MOE bit field is cleared. When MOE is not cleared, match events may be enabled and may produce rising, falling or toggle output events. In PWM mode, both the Equal-To and the greater-than-or-equal-to match registers are enabled as long as the appropriate MOE bit field is not cleared and the appropriate counter stop bit is not set (CSTU or CSTL).

In fuel mode, Equal-To match registers are enabled when the MOE bit field is not cleared. The greater-than-or-equal-to match registers are only enabled when all the conditions as described above are met. One exception to this is the enabling of the Minimum Off Time Match register during the minimum off time operation. The MOE2 (Minimum Off Time Output Edge) bit field is disabled in the minimum off time delay operation for reasons described in the MOTD bit field definition. In this case the enabling of MOTM is not dependent on the MOE2 bit field.

The capture function is also enabled by the MOE bit fields (fuel mode only). At least one match register must be enabled to produce output events for the capture function to be enabled.

Also, when the FIC 40 is configured for 32-bit operation, the greater-than-or-equal-to match registers are controlled by the MOE3 (Fuel Pulse Match Output Edge) bit field. Therefore, MOE2 is disabled in 32-bit mode. The following shows which registers (in fuel and PWM mode) are controlled by each of the four sets of MOE bit fields in the FIC 40:

MOE0—First Edge Match/Period Match 0
MOE1—End Angle Match/Period Match 1
MOE2—Minimum Off Time Match/Pulse Match 0
MOE3—Fuel Pulse Match/Pulse Match 1
The MOE bit fields are cleared upon reset.

| MOE | Type of Edge Generated |
| --- | --- |
| 0 0 | Inhibit match events and disable output events |
| 0 1 | Rising edge |
| 1 0 | Falling edge |
| 1 1 | Output toggle |

The force match event (FME) bit fields allow the CPU to immediately force match events by overriding the comparators. When set, FME forces a match event regardless of the associated MOE bit field value, and regardless of a match interlock. This match event sets the status and flag bits as if the match event occurred naturally as a result of a true comparison. If the MOE bit field is not cleared, the forced match event also generates an output event as programmed by the MOE bit field. The hardware automatically clears this bit after it forces the match event (i.e. an FME bit is set only by the CPU and cleared only by the FIC 40). The only time that the FME bits have no effect is when they are cleared, or the FIC 40 is disabled (i.e. when DOME and MOS1 are both set). If FME0 and FME1 are set by the CPU at the same time, the FIC 40 and status bits behave as if FEM and EAM occurred at the same time, i.e. if the DOME bit is cleared, FME has precedence, otherwise, EAM has precedence.

Also, when the FIC 40 is configured for 32-bit operation, the greater-than-or-equal-to match registers are controlled by the FME3 (Fuel Pulse Force Match Event) bit field. Therefore, FME2 (Minimum Off Time Force Match Event) is disabled in 32-bit mode. The following shows which registers (in fuel and PWM mode) are controlled by each of the four sets of FME bit fields in the FIC 40:

---
FME0—First Edge Match/Period Match 0
FME1—End Angle Match/Period Match 1
FME2—Minimum Off Time Match/Pulse Match 0
FME3—Fuel Pulse Match/Pulse Match 1
The FME bit fields are cleared upon reset.
---

The 16/32 bit determines if the greater-than-or-equal-to match registers and the up counter registers, operate as single 32-bit registers or as separate 16-bit registers. When 16/32 is cleared, the registers are in 32-bit operation and use the Fuel Pulse Match and the Lower Counter control and status bits to control their operation. The MOTD bit is also disabled when 16/32 is cleared. When 16/32 is set, the greater-than-or-equal-to match registers operate as two 16-bit independent match registers with independent control and status bits.

The 16/32 bit has no effect when the FIC 40 is operating in PWM mode and has no effect on the TOM bit field operation. 16/32 is cleared upon reset. The bit field encoding for 16/32 is:

---
16/32

0—32 bit operation
1—16 bit operation
---

The 12/16-bit match fields (12/16U and 12/16L) determine if the equal-to match registers compare against 16-bits of the timer bus or only the least significant 12-bits. since there are degree timebases which carry cylinder information in the high order four bits, the compare operation may be only 12-bits. 12/16U controls the First Edge Match register and 12/16L controls the End Angle Match register. These bit fields are disabled in PWM mode since the equal-to match registers only compare against the up counter. 12/16U and 12/16L are cleared upon reset.

The match output status bits (MOS) indicate the occurrence of match events. An MOS bit is set upon the occurrence of a match event and remains set until a CPU service clears the bit using the standard mechanism.

In fuel mode, the MOS1 bit may also be cleared by setting the DOME bit (configuring the FIC 40 to be disabled upon the next End Angle Match event). A CPU service of MOS1 (End Angle Match Status) when DOME is set, or clearing DOME, is then required to re-enable to FIC 40. No MOS bit servicing is required if DOME is cleared.

When the FIC 40 is configured for 32-bit greater-than-or-equal-to match register controls the MOS3 (Fuel Pulse Match Status) bit. Therefore, MOS2 (Minimum Off Time Match Status) has no significance in 32-bit operation. In other words, in 32-bit operation, MOS2 does not provide any useful status of Minimum Off Time Match status. If the bit was originally set, it remains, if it was originally cleared, it remains cleared.

The following shows which registers (in fuel and PWM modes) control each of the four MOS bits in the FIC 40:

---
MOS0—First Edge Match/Period Match 0
MOS1—End Angle Match/Period Match 1
MOS2—Minimum Off Time Match/Pulse Match 0
MOS3—Fuel Pulse Match/Pulse Match 1
The MOS bit fields are cleared upon reset.
MOS 0—Match event has not occurred
1—Match event has occurred
---

In fuel mode, the match output flag bits (MOF) indicate the occurrence of match events. However, the MOF bits do not act as status bits which require a CPU service to clear. An MOF bit is set upon the occurrence of a match event and remains set until the hardware clears it. If the First Edge Match and End Angle Match are simultaneously recognized, the state of the flag bits reflect the prevailing match. These bits provide recent status of the FIC 40 without requiring the CPU to clear them after each match. Therefore, the MOF bits are read-only to the CPU.

MOF1 and MOF3 are cleared upon first edge output events. Since these flags indicate whether (second edge) match events have occurred by End Angle Match and Fuel Pulse Match, they must be cleared on first edge output occurrences. MOF0 and MOF2 are cleared upon second edge output events. Since these flags indicate whether (first edge) match events have occurred by First Edge Match and Minimum Off Time Match, they must be cleared on second edge output occurrences. If two opposite edge output events are simultaneously generated, no flag bits are cleared.

The FIC 40 uses the CPIE bit to determine which edge (rising or falling) is a first edge and which is a second edge. Therefore, the CPIE bit must be properly configured to guarantee proper MOFX bit operation. In addition, DOME has no effect on either the setting or the clearing of these bits.

When the FIC 40 is configured for 32-bit operation, the 32-bit greater-than-or-equal-to match register controls the MOF3 (Fuel Pulse Match Flag) bit. Therefore, MOF2 (Minimum Off Time Match Flag) has no significance in 32-bit operation. In other words, in 32-bit operation, MOF2 does not provide any useful status of Minimum Off Time Match status. If the bit was originally set, it remains set, if it was originally cleared it remains cleared.

In addition, the clearing of these flags is specific to the fuel application so these flags are disabled in PWM mode. The following shows which registers control each of the four MOF bits in the FIC 40:

---
MOF0—First Edge Match
MOF1—End Angle Match
MOF2—Minimum Off Time Match
MOF3—Fuel Pulse Match
The MOF bit fields are cleared upon reset.
MOF 0—Match event may have occurred but has been cleared
1—Match event has occurred
---

Up Counter Control and Status

The up counter control and status bit fields select the counter clock source, control the enabling of the counters, stop and hold the counters, and provide increment to zero status.

The up counters are compared against the greater-than-or-equal-to match registers to generate output events after a programmed duration of time. In fuel mode, the up counters are enabled and cleared on selected output levels. The pulse width Up Counter (Lower counter in sixteen bit mode Lower and Upper Counter in 32 bit mode) may also be cleared on First Edge match events when an FEM event occurs simultaneously with an EAM and DOME is cleared. In PWM mode, the up counters are always enabled and are cleared upon Period Match 0 and/or Period Match 1 events.

The up counter clock bit fields, CLKU and CLKL, select one of eight clock sources from the Clock Bus for Upper Counter and Lower Counter, respectively. The selected clock source increments the up counter when it is enabled. When the FIC 40 is configured for 32-bit operation, CLKL controls the operation of the up counter and CLKU is disabled. The CLKU and CLKL bit fields are cleared upon reset.

| CLKU CLKL | | | Clock Source |
|---|---|---|---|
| 0 | 0 | 0 | System Clock/2 |
| 0 | 0 | 1 | 4 MHZ (crystal frequency) |
| 0 | 1 | 0 | Engineering Clock (1 MHZ) |
| 0 | 1 | 1 | Engineering Clock/4 |
| 1 | 0 | 0 | Engineering Clock/16 |
| 1 | 0 | 1 | Engineering Clock/1024 |
| 1 | 1 | 0 | Filtered CPS tooth event (TIE) |
| 1 | 1 | 1 | Degree Clock Ticks (DT) |

The counter level bit fields, CLU and CLL, select what output event level, if any, enables the incrementing of Upper Counter and Lower Counter in fuel mode. The output event level is the logical state being driven to the output pin or status event bus line as a result of a match event. Whenever the CLU or CLL bit field corresponds to the present output event level, the counter is enabled to increment. The enabled counter is also cleared prior to incrementing, except when the counter-is stopped in software, see CSTU and CSTL below. If CLU or CLL is cleared, the associated up counter is disabled and holds its present value. Also in fuel mode, the counters are disabled and hold their present value when the output event level changes, or when the greater-than-or-equal-to match register asserts a match event (even if it does not produce an output event).

In PWM mode, these bit fields have no effect and the up counters are enabled by the PWM bit and are cleared by Period Match 0 and Period Match 1 events (a counter is not cleared if it is stopped in software via CSTU or CSTL).

When the FIC 40 is configured for 32-bit operation, CLL controls the single 32-bit up counter and CLU is disabled. CLU and CLL are cleared upon rest.

| CLKU and CLKL | | Clock Enable |
|---|---|---|
| 0 | X | Counting Disabled |
| 1 | 0 | count while output event level is low and a match has not been asserted |
| 1 | 1 | Count while output event level is high and a match has not been asserted |

The counter stop bits, CSTU and CSTL, select if the Upper Counter and Lower Counter, respectively, stop incrementing and hold the present count value. When the CPU sets CSTU or CSTL, the respective up counter stops incrementing and holds its value. The match register associated with the counter is also disabled. For example, if CSTU is set, Minimum Off Time Match is disabled. (The Equal-To Match registers are also stopped by the respective CSTU or CSTL assertions in PWM mode). Changes to the output event level have no effect on a stopped up counter. Therefore, the setting of one of the counter stop bits inhibits the clearing of the counter except by a system reset, or a CPU write.

When the CSTU or CSTL bit is cleared, the respective counter resumes incrementing if it is enabled, or remains stopped and does not increment if it is disabled. Likewise, when the CSTU or CSTL bit is cleared, the respective greater-than-or-equal-to match register resumes matching if it is enabled, or remains disabled if it is disabled in software.

When the FIC 40 is configured for 32-bit operation, CSTL controls the single 32-bit up counter and CSTU is disabled. CSTU and CSTL are cleared upon request.

The increment to zero status bits (IZSU and IZSL) indicate if an up counter has incremented to zero since the last CPU service that cleared the appropriate status bit. IZSU is set by the Upper Counter incrementing to a count value of $0000. IZSL is set by the Lower Counter incrementing to a count value of $0000. The standard mechanism is used to clear the IZSU and IZSL bits.

When the FIC 40 is configured for 32-bit operation, IZSL is controlled by the single 32-bit up counter and IZSU has no effect. In other words, in 32-bit operation, IZSU does not provide any useful status of Upper Counter Increment to Zero status. If the bit was originally set, it remains set, if it was originally cleared, it remains cleared. IZSU and IZSL are cleared upon reset.

Output Event Control and Status

The output event control and status bit fields control the mode and operation of the channel, control the enabling of a second output event for PWM mode (DC01), control the enabling of the End Angle Match output event (EAMO), and control the destination of all output events (FOP, DCO0, DCO1, and EAMO).

In fuel mode, there are two outputs that may drive the output pin and/or status event bus. The fuel output pulse (FOP) may drive either a hardwired (mask programmed) pin or status event line. The End Angle Match Output (EAMO) may only drive a hardwired status event line.

In PWM mode, the FIC 40 supports the generation of two PWM outputs, DCO0 and DCO1. Both outputs are hardwired (mask programmed), to separate output pin and status event bus lines.

The pulse width modulation bit (PWM) specifies whether the FIC 40 is enabled to operate in PWM or fuel mode. When set, PWM switches the channel to PWM mode and disables or ignores functionality relevant only to fuel (i.e. the CPIE, FECTB, SECTB, FEMTB, EAMTB, SECS, SCC, DOME, EAMOS, CLU, CLL, 16/32, 12/16U, 12/16L and MOTD bit fields). In PWM mode, the following operations occur:

Data Transfers occur as described above.

Upper Counter is cleared on Period Match 0 events land Lower Counter is cleared on Period Match 1 events. Both counters are always enabled.

The PWM1 output event logic is enabled. The EAMO output is disabled.

Captures are disabled and the registers become Holding registers.

The equal-to comparators match against the Up Counters (not the Timer Bus).

The minimum off time operation is disabled.

The Up Counter to the Previous Fuel Pulse Width holding register transfer is disabled.

All flag bits are disabled (as well as capture status bits).

When the PWM bit is cleared, the FIC 40 operates in fuel mode. All control bits fields may be programmed to function as described above. The PWM bit field is cleared upon request.

The minimum off time delay bit field (MOTD) enables or disables the minimum off time operation while operating in 16-bit fuel mode. When enabled, the minimum off time operation delays a First Edge Match event edge (rising or falling) from driving the output pin or status event bus until a programmed minimum off time has expired. This guarantees a minimum time when the fuel pulse is off, before the next pulse begins.

This operation is triggered upon a selected output event occurrence. If the CLU bit field is programmed to enable Upper Counter when the output level is low, then the MOTD operation (MOTM enabling), is triggered by a falling edge output event.

The minimum off time is written to the Minimum Off Time Match register. When the off time has expired, Minimum Off Time Match generates a match event which signals the FIC 40 to stop inhibiting First Edge Match events from driving the output pin or status event bus. If a First Edge Match event occurred before the minimum off time had expired, then the First Edge Match event produces an output as soon as MOTM does time-out. If the minimum off time has not expired when an End Angle Match event occurs, the current MOTD is aborted. If a First Edge Match edge is pending and the End Angle Match occurs, the First Edge Match event is discarded and a truncation case is indicated by the assertion of the EAMO signal.

In the minimum off time operation, the Minimum Off Time Match register cannot generate an output event but must generate a match event. Therefore, the MOE2 bit field is disabled during minimum off time operation.

The effect of the MOTD operation is to delay the pulses subsequent to a Second Edge Match in the same cycle but not shorten it. MOTD has no effect in PWM mode or in 32-bit fuel operation and is cleared upon reset.

The End Angle Match Output Select (EAMOS) bit field selects the source of the End Angle Match Output (EAMO) signal. When EAMOS is cleared, the EAMO signal is driven to a hardwired (mask programmed) status line on every End Angle Match event. When EAMOS is set, the EAMO signal is driven every time an End Angle Match truncates the fuel pulse. An End Angle Match event is considered to have "truncated" the fuel pulse if the End Angle Match event occurs while the pin is in the asserted state or when an End Angle Match event occurs while a First Edge Match event is pending output event generation due to the minimum off time condition. This is true whether or not the End Angle Match event causes a second edge. In other words, when a First Edge Match occurs simultaneously with an End Angle Match event, a truncation output can be generated regardless of the state of DOME. In the event that EAM asserts a match event and the FPM register is disabled by MOE3, the truncation signal will not be asserted when EAMOS is set.

Match events produced by FME1 can cause EAMO outputs to be driven. The EAMO signal is a toggle status only output event.

The EAMOS bit field provides the ability for the FIC 40 to drive a status line which could be programmed by the Pin Control Channel 41 to produce an interrupt. EAMOS is disabled (EAMO cannot be driven) in PWM mode or in fuel mode when OEDC0 is set. EAMOS is cleared upon reset.

The output event destination control bit field (OEDC) selects the destination of output events. OEDC can select one of two destinations for an output event: a hardwired (mask programmed), pin event bus line or a hardwired (mask programmed), status event bus line. OEDC0 controls the destination of the Fuel mode output event (FOP) and the End Angle Match output event (EAMO), or the PWM mode output event (DCO0), generated by Period Match 0 and Pulse Match 0. The OEDC0 bit field is cleared upon reset.

The output event destination control bit field selects the destination of an output event. OEDC1 can select one of two destinations for the output event: a hardwired (mask programmed), pin event bus line or a hardwired (mask programmed), status event bus line. OEDC1 controls the destination of the second PWM mode output event (DC01), generated by Period Match 1 and Pulse Match 1. OEDC1 is disabled in fuel mode and is cleared upon reset.

Fuel Mode Operation

In fuel mode, the FIC 40 uses two capture registers to capture time or degree timebases corresponding to the two edges of the fuel pulse. It uses two match registers and equal-to comparators to schedule when the first edge occurs in angle or absolute time, and to schedule when the end of the engine cycle occurs for a particular cylinder. Two match registers and greater-than-or-equal-to comparators are used to schedule events to occur after a certain period of time. One match register is used to support the minimum off time operation and one is used to hold the fuel pulse width to generate the second edge of the pulse. Two up counters are used to provide a local timebase which the greater-than-or-equal-to comparators match against. One 32-bit holding register is used to store the contents of the counter upon second edge output events. Two holding registers are also used to transfer parameters to two of the match registers at the beginning of the engine cycle.

The FIC 40 provides support to drive two outputs when operating in fuel mode. One output drives the FOP (Fuel Output Pulse) signal to a hardwired (mask programmed) output pin or status event bus line as programmed by the OEDC0 bit field. The second output drives the EAMO (End Angle Match Output) signal to a hardwired (mask programmed) output status event line as programmed by the OEDC0 bit field. In the fuel application, FOP is used to control the fuel injector 29. EAMO is used as a potential source of interrupts to the CPU which signals whether an End Angle Match event truncated the FOP (caused a second edge), or whether an End Angle Match event occurred regardless of the state of FOP. The EAMO signal may only be driven as a toggle output signal (i.e. the output level of an event on EAMO may not be programmed).

New parameter values for the match and holding registers may be written by the CPU at any time. At the beginning of an engine cycle, the holding registers may transfer new parameter values to two of the match registers. If any other match registers need updated values, the CPU can write the new values to the appropriate register such that they are valid for the present engine cycle. The following lists the registers in the FIC 40 and an example of the type of parameters they may hold:

| | |
|---|---|
| First Edge Capture: | Holds a captured timebase corresponding to the occurrence of the first edge of the fuel pulse. |
| Second Edge Capture: | Holds a captured timebase corresponding to the occurrence of the second edge of the fuel pulse. |

| | |
|---|---|
| First Edge Match: | Holds an angle or time that schedules when the first edge will be generated. |
| End Angle Match: | Holds an angle that schedules the end of the present engine cycle and the beginning of the next. |
| Next First Edge: | Holds the first edge match value to be used during the next engine cycle. |
| Next Fuel Pulse: | Holds the fuel pulse width value to be used during the next engine cycle. |
| Minimum Off Time Match: | Holds a value that specifies the minimum time that the output pulse must remain in the inactive state. |
| Fuel Pulse Match: | Holds a value that determines the width of the output pulse. |
| Up Counters: | Hold the present count values for the Minimum Off Time Match and the Fuel Pulse Match registers. |
| Previous Fuel Pulse Width: | Holds the previous value of Lower Counter in 16-bit operation, and holds the previous value of the entire Up Counter in 32-bit operation. |

The End Angle Match register signals the beginning of a new engine cycle. This event causes the holding registers to transfer new First Edge Match and Fuel Pulse Match register values. Upon a First Edge Match an output event is triggered, the reflected input event corresponding to this output event triggers the First Edge Capture register to store a time or degree timebase.

After a first edge has been generated, the End Angle Match register and the Fuel Pulse Match register begin performing comparisons and drive second edges (on FOP) to the output event bus when a match event occurs. End Angle Match may also be configured to drive a toggle output to an output event status bus on the EAMO signal. If the Fuel Pulse Match register generates a match event first, a second edge is driven to the output event bus, the Minimum Off Time Match function begins, the Second Edge Capture register captures a time or degree timebase and the End Angle Match register continues its comparisons until the end of the engine cycle.

If the End Angle Match register generates a match event after the Fuel Pulse Match register, then a second edge is again driven to the output event bus (has no effect on the pin state), an active Minimum Off Time Match function is canceled, and data transfers occur as described above. If the End Angle Match register generates a match event before the Fuel Pulse Match register, a second edge is driven to the output event bus (does have an effect on the pin state), the Second Edge Capture register captures a time or degree timebase and data transfers occur as described above. In either case, the FIC 40 may be configured to drive a toggle output on End Angle Match Output (EAMO).

Upon the second edge output event, whether it is produced by End Angle Match or Fuel Pulse Match, the contents of the Up Counter associated with the fuel pulse is transferred to the Previous Fuel Pulse Width holding register. In 16-bit operation, the value of the Lower Counter is transferred to the lower 16-bits of Previous Fuel Pulse Width and the upper 16 bits are driven to $0000. In 32-bit operation, the value of the entire 32-bit Up Counter is transferred to the Previous Fuel Pulse Width register.

In continuous mode (DOME=0), if the End Angle Match and the First Edge Match occur at the same time, then a first edge only is driven to the output event bus, and active Minimum Off Time Match function is suspended, the internal Fuel Pulse timebase is cleared and started, and data transfers occur as described above. This sequence of operations may continue without CPU servicing. CPU servicing could be done to read capture register values, update match register values or clear status bits.

In Disable On Match Event mode (DOME=1), End Angle Match event disables the channel, i.e., further matches are disabled, and in the case of EAM coincident with FEM, an EAM edge (specified by MOE1) is driven to the output event bus.

PWM Mode Operation

If the FIC 40 is not used to generate fuel pulses, one or two PWM output pulses may be generated. This mode is mutually exclusive of fuel mode so PWMs cannot be generated while fuel pulses are generated. The following describes how the FIC 40 is used to produce PWM output pulses.

In PWM mode, the FIC 40 uses the capture registers as holding registers which transfer the two periods for the next output pulses. The other two holding registers are used to transfer the two pulse widths for the next output pulses. Two match registers and two equal-to comparators are used to schedule the end of the present pulse periods and the beginning of the next output pulses. Two match registers and two greater-than-or-equal-to comparators are used to schedule pulse width match events which specify the On Time of the periodic output pulse. The two up counters are used to provide a local timebase which all the comparators use to match against.

PWM mode makes use of the second output event of the FIC 40 since the FIC 40 supports the generation of two PWM output pulses. The registers in the most significant half-word of the memory map as described above are used to produce the DCO0 (Duty Cycle Output 0). The registers in the least significant half-word of the memory map, as described above, are used to produce the DCO1 (Duty Cycle Output 1) signal. Each of these signals is driven to a hardwired (mask programmed), output pin or status bus line as programmed by the OEDC bit fields.

When entering PWM mode out of reset, the FIC 40 is in fuel mode (PWM bit is cleared). Once the PWM bit is set, the counters are enabled and begin to increment. Therefore, the match registers should be 10 enabled during the same write as the PWM bit. This configuration may be preceded by a write of match register values.

Future parameter values for the match and holding registers may be written by the CPU at any time. Alternatively, at the beginning of a new output pulse period, the holding registers may transfer new parameter values to the match registers. Coherent PWM data transfers are performed in the FIC 40 by first disabling transfers by means of the TOM bit field. The new pulse width and period values may then be written into the match registers and/or the holding registers. Data transfers may be re-enabled at any time. The following lists the registers in the FIC 40 and an example of the type of parameters they may hold:

| | |
|---|---|
| Next Period 0: | Holds the value for the period of the next DCO0 pulse. |
| Next Period 1: | Holds the value for the period of the next DCO1 pulse. |
| Period Match 0: | Holds the percent DCO0 pulse |

| | |
|---|---|
| Period Match 1: | period match value.<br>Holds the percent DCO1 pulse period match value. |
| Next Pulse 0: | Holds the value for the pulse width of the next DCO0 pulse. |
| Next Pulse 1: | Holds the value for the pulse width of the next DCO1 pulse. |
| Pulse Match 0: | Holds the present DCO0 pulse width match value. |
| Pulse Match 1: | Holds the present DCO1 pulse width match value. |
| Up Counters: | Hold the present count values for the Pulse Width Match 0 and 1 and Period Match 0 and 1 registers. |

Since there is support for two PWM outputs in the FIC 40, each PWM is independently operated and controlled but each PWM functions identically to the other. Therefore, a description of the operation in this mode is given here for only one output pulse.

The Period Match 0 register signals the end of the present output pulse and the beginning of the next output pulse. This event causes the transfer of data from Next Period 0 to Period Match 0 and from Next Pulse 0 to Pulse Match 0. It also clears the enabled Upper counter. In this mode, the equal-to comparators compare match values to the up counters and not the timer bus. Therefore, both Period Match 0 and Pulse Match 0 are constantly performing comparisons against the Upper Counter value.

In PWM operation, the Pulse Match 0 register asserts a match event first, driving the second edge of the output pulse that the Period Match 0 began. The Period Match 0 register eventually asserts a match event that ends the present output pulse period and drives the first edge of the next output pulse.

To ensure that an output pulse is produced after initialization (or reset) when the pin state is initially inactive, all match registers must first be enabled. Once the registers are enabled, and the FIC 40 is configured for PWM mode, an output as programmed by the Period Match 0 output edge (MOE0) is generated. Since this output is not generated by the Period Match 0 register itself, a data transfer does not take place and match status is not set. Period Match 0 events are assumed to transition the pin to the active state. In both cases (initialization and reset), the FIC 40 then proceeds with operation as described previously. If the Pulse Match 0 is written to $0000, an output is generated as programmed by the Pulse Match 0 output edge bit field (MOE2) and normal operation resumes.

This mode also supports 0% and 100% duty cycle outputs. When the Pulse Match 0 register is loaded with $0000, the FIC 40 generates an output event specified by the Pulse Match 0 match output edge bit field (MOE2). This procedure may be used to generate a 0% duty cycle output. When the value in the Pulse Match 0 register is greater than or equal to the value in the Period Match 0 register but is not $0000, the FIC 40 generates an output event specified by the Period Match 0 match output edge bit field (MOE0). This procedure may be used to generate a 100% duty cycle output. In the case where both match registers have the value $0000, the output event is always generated by the Pulse Match 0 register.

Since operation should proceed glitch free while the duty cycle is changed, there is one situation where the FIC 40 in PWM mode must operate differently than described above. When the next pulse match values are programmed for 0% duty cycle (i.e. Next Pulse 0=$0000 and MOE2=10), and data transfers to the Period Match 0 and Pulse Match 0 registers are enabled, then the Period Match 0 register is inhibited from producing an output event and the output remains low. The Period Match 0 event still triggers a data transfer. The same discussion is valid if Next Pulse 0=$0000 and MOE2=01. A glitch free 100% duty cycle output pulse is generated.

While the best modes for carrying out the invention have been described in detail, those familiar with the art to which this invention relates will recognize various alternative designs and embodiments for practicing the invention as defined by the following claims.

What is claimed is:

1. A method for generating a fuel pulse output signal utilizing a processor to control fuel delivery from a fuel injector to a cylinder of an internal combustion engine, the method comprising:

providing a plurality of memory-mapped holding registers adapted to asynchronously receive a plurality of fuel pulse data from the processor and for storing the plurality of fuel pulse data until subsequent fuel pulse data is received from the processor;

providing a plurality of match registers coupled to the plurality of holding registers for comparing the fuel pulse data with a reference signal; and generating a fuel pulse output signal based on the comparison between the plurality of fuel pulse data and the reference signal.

2. The method as recited in claim 1 wherein the plurality of fuel pulse data includes a first edge value and wherein the step of comparing the fuel pulse data with the reference signal includes the step of comparing the first edge value with the reference signal and wherein the step of generating the fuel pulse output signal includes the step of generating a first edge of the fuel pulse output signal.

3. The method as recited in claim 2 wherein the step of comparing the first edge value with the reference signal is performed upon the occurrence of a predetermined event.

4. The method as recited in claim 3 wherein the predetermined event corresponds to a beginning of a new cycle of the internal combustion engine.

5. The method as recited in claim 2 wherein the plurality of fuel pulse data further includes a second edge value and a pulse duration value and wherein the step of comparing the fuel pulse data with the reference signal includes the step of comparing the second edge value and the pulse duration with the reference signal in response to the generation of the first edge of the fuel output pulse signal and wherein the step of generating the fuel pulse output signal further includes the step of generating a second edge of the fuel pulse output signal based on a match between the reference signal and one of the second edge value and the pulse duration.

6. The method as recited in claim 5 wherein the plurality of fuel pulse data includes a minimum off time value and the step of generating the second edge further comprises:

in response to the match between the pulse duration and the reference signal, comparing the minimum off time value with the reference signal;

comparing the first edge value and the second edge value with reference signal; and generating a new first edge of the fuel pulse output signal in response to a match between the reference signal and both the minimum off time value and the first edge value.

7. The method as recited in claim 5 further comprising the step of providing a counter for counting a duration of the fuel pulse output signal from the generation of the first edge to the generation of the second edge.

8. The method as recited in claim 1 wherein the reference signal is a time timebase signal.

9. The method as recited in claim 1 wherein the reference signal is a degree timebase signal.

10. The method as recited in claim 1 wherein the step of providing the plurality of memory-mapped holding registers includes the step of sensing a predetermined event and wherein the plurality of memory-mapped holding registers receive the subsequent fuel pulse data from the processor upon sensing the predetermined event.

11. The method as recited in claim 1 further comprising the step of providing a plurality of capture holding registers for capturing a timebase upon the occurrence of a match between the reference signal and the plurality of fuel pulse data.

12. A system for generating a fuel pulse output signal utilizing a processor to control fuel delivery from a fuel injector to a cylinder of an internal combustion engine, the system comprising:

a plurality of holding registers adapted to asynchronously receive a plurality of fuel pulse data from the processor;

a plurality of match registers coupled to the plurality of holding registers for comparing the plurality of fuel pulse data with a reference signal and for generating a fuel pulse output signal based on the comparison between the fuel pulse data and the reference signal; and wherein the plurality of storage devices are memory-mapped and store the plurality of fuel pulse data until subsequent fuel pulse data is received from the processor.

13. The system as recited in claim 12 wherein the plurality of fuel pulse data includes a first edge value and wherein the plurality of match registers compare the first edge value with the reference signal and generate a first edge of the fuel pulse output signal.

14. The system as recited in claim 13 wherein the first edge value is compared with the reference signal upon the occurrence of a predetermined event.

15. The system as recited in claim 14 wherein the predetermined event corresponds to a beginning of a new cycle of the internal combustion engine.

16. The system as recited in claim 13 wherein the plurality of fuel pulse data further includes a second edge value and a pulse duration value and wherein the plurality of match registers compare the second edge value and the pulse duration with the reference signal in response to the generation of the first edge of the fuel output pulse signal and generate a second edge of the fuel pulse output signal based on a match between the reference signal and one of the second edge value and the pulse duration.

17. The system as recited in claim 16 wherein the plurality of fuel pulse data includes a minimum off time value and the plurality of match registers further perform the following:

in response to the match between the pulse duration and the reference signal, comparing the minimum off time value with the reference signal;

comparing the first edge value and the second edge value with reference signal; and generating a new first edge of the fuel pulse output signal in response to a match between the reference signal and both the minimum off time value and the first edge value.

18. The system as recited in claim 16 further comprising a counter for counting a duration of the fuel pulse output signal from the generation of the first edge to the generation of the second edge.

19. The system as recited in claim 12 wherein the plurality of memory-mapped holding registers receive the subsequent fuel pulse data from the processor upon the processor sensing a predetermined event.

20. The system as recited in claim 12 further comprising a plurality of capture holding registers for capturing a timebase upon the occurrence of a match between the reference signal and the plurality of fuel pulse data.

* * * * *